(12) United States Patent
Turbiner et al.

(10) Patent No.: US 10,746,849 B2
(45) Date of Patent: Aug. 18, 2020

(54) BEAM-FORMING RECONFIGURABLE CORRELATOR (PULSE COMPRESSION RECEIVER) BASED ON MULTI-GIGABIT SERIAL TRANSCEIVERS (SERDES)

(71) Applicant: General Radar Corp., Palo Alto, CA (US)

(72) Inventors: Dmitry Turbiner, Palo Alto, CA (US); Jon Williams, San Francisco, CA (US)

(73) Assignee: General Radar Corp., Menlo Park, CA (US)

( * ) Notice: Subject to any disclaimer, the term of this patent is extended or adjusted under 35 U.S.C. 154(b) by 103 days.

(21) Appl. No.: 15/482,674

(22) Filed: Apr. 7, 2017

(65) Prior Publication Data

US 2018/0059215 A1  Mar. 1, 2018

Related U.S. Application Data

(63) Continuation-in-part of application No. 15/406,113, filed on Jan. 13, 2017, now Pat. No. 10,656,244.
(Continued)

(51) Int. Cl.
*G01S 7/32* (2006.01)
*G01S 17/26* (2020.01)
(Continued)

(52) U.S. Cl.
CPC ............... *G01S 7/32* (2013.01); *G01S 7/285* (2013.01); *G01S 7/486* (2013.01); *G01S 7/487* (2013.01);
(Continued)

(58) Field of Classification Search
CPC .......... G01S 7/292; G01S 7/032; G01S 13/32; G01S 17/26
See application file for complete search history.

(56) References Cited

U.S. PATENT DOCUMENTS 3,170,158 A * 2/1965 Rotman .................. H01Q 3/46
342/376
3,680,137 A * 7/1972 Wright ................... H01Q 3/242
342/368
(Continued)

FOREIGN PATENT DOCUMENTS

DE  102011056963 B3 *  9/2012 ............. G01S 7/292

*Primary Examiner* — Bernarr E Gregory
(74) *Attorney, Agent, or Firm* — Davis Malm & D'Agostine, P.C.; David J. Powsner

(57) ABSTRACT

Aspects of the invention provide improvements to electromagnetic and other wave-based ranging systems, e.g., RADAR or LIDAR systems, of the type having transmit logic that transmits a pulse based on an applied analog signal. The improvements are characterized, in part, by a SERDES having a serializer (a/k/a a "transmit side") that is coupled to the transmit logic. The serializer has (i) an input to which a pattern on which the pulse is based is applied and (ii) an output from which a serialization of the pattern is applied to the transmit logic. The improvements are further characterized in that the SERDES has deserializer logic (a/k/a a "receive side") that is coupled to receive logic and that deserialize a received "analog" signal containing possible reflections of the pulse. According to various aspects of the invention, the transmit and/or receive logic can include circuitry for directionally steering pulses transmitted into the environment and/or the directional sensitivity of the system to possible reflects of those pulses.

20 Claims, 12 Drawing Sheets

Related U.S. Application Data

(60) Provisional application No. 62/320,159, filed on Apr. 8, 2016, provisional application No. 62/320,159, filed on Apr. 8, 2016.

(51) Int. Cl.
*G01S 7/285* (2006.01)
*G01S 15/931* (2020.01)
*G01S 13/42* (2006.01)
*G01S 7/487* (2006.01)
*G01S 7/486* (2020.01)
*G01S 13/931* (2020.01)
*G01S 13/00* (2006.01)

(52) U.S. Cl.
CPC ............ *G01S 13/42* (2013.01); *G01S 13/931* (2013.01); *G01S 15/931* (2013.01); *G01S 17/26* (2020.01)

(56) References Cited

U.S. PATENT DOCUMENTS

| | | | | |
|---|---|---|---|---|
| 3,887,918 A | * | 6/1975 | Bailey | G01S 13/288 342/189 |
| 4,237,461 A | * | 12/1980 | Cantrell | G01S 13/288 342/194 |
| 4,359,736 A | * | 11/1982 | Lewis | G01S 13/288 342/16 |
| 4,373,190 A | * | 2/1983 | Lewis | G01S 13/288 342/196 |
| 4,408,205 A | * | 10/1983 | Hockham | G01S 7/2813 342/157 |
| 4,509,051 A | * | 4/1985 | Lewis | G01S 13/288 342/196 |
| 4,513,288 A | * | 4/1985 | Weathers | G01S 13/288 342/189 |
| 4,513,289 A | * | 4/1985 | Kretschmer | G01S 13/288 342/196 |
| 4,566,011 A | * | 1/1986 | Lewis | G01S 13/288 342/196 |
| 4,661,819 A | * | 4/1987 | Lewis | G01S 13/288 342/201 |
| 4,813,006 A | * | 3/1989 | Burns | G01S 13/288 342/189 |
| 4,833,479 A | * | 5/1989 | Carlson | G01S 13/288 342/194 |
| 5,038,365 A | * | 8/1991 | Belloc | H04L 27/00 341/61 |
| 5,677,697 A | * | 10/1997 | Lee | G01S 7/282 342/368 |
| 7,656,325 B1 | * | 2/2010 | Andreev | H03K 5/135 341/100 |
| 7,656,341 B2 | * | 2/2010 | Reeves | G01S 13/32 342/195 |
| 2005/0135467 A1 | * | 6/2005 | Asuri | H03H 21/0012 375/232 |
| 2005/0135468 A1 | * | 6/2005 | Asuri | H03H 21/0012 375/232 |
| 2008/0204309 A1 | * | 8/2008 | Reeves | G01S 13/32 342/195 |
| 2012/0146842 A1 | * | 6/2012 | Kang | G01S 7/032 342/175 |

* cited by examiner

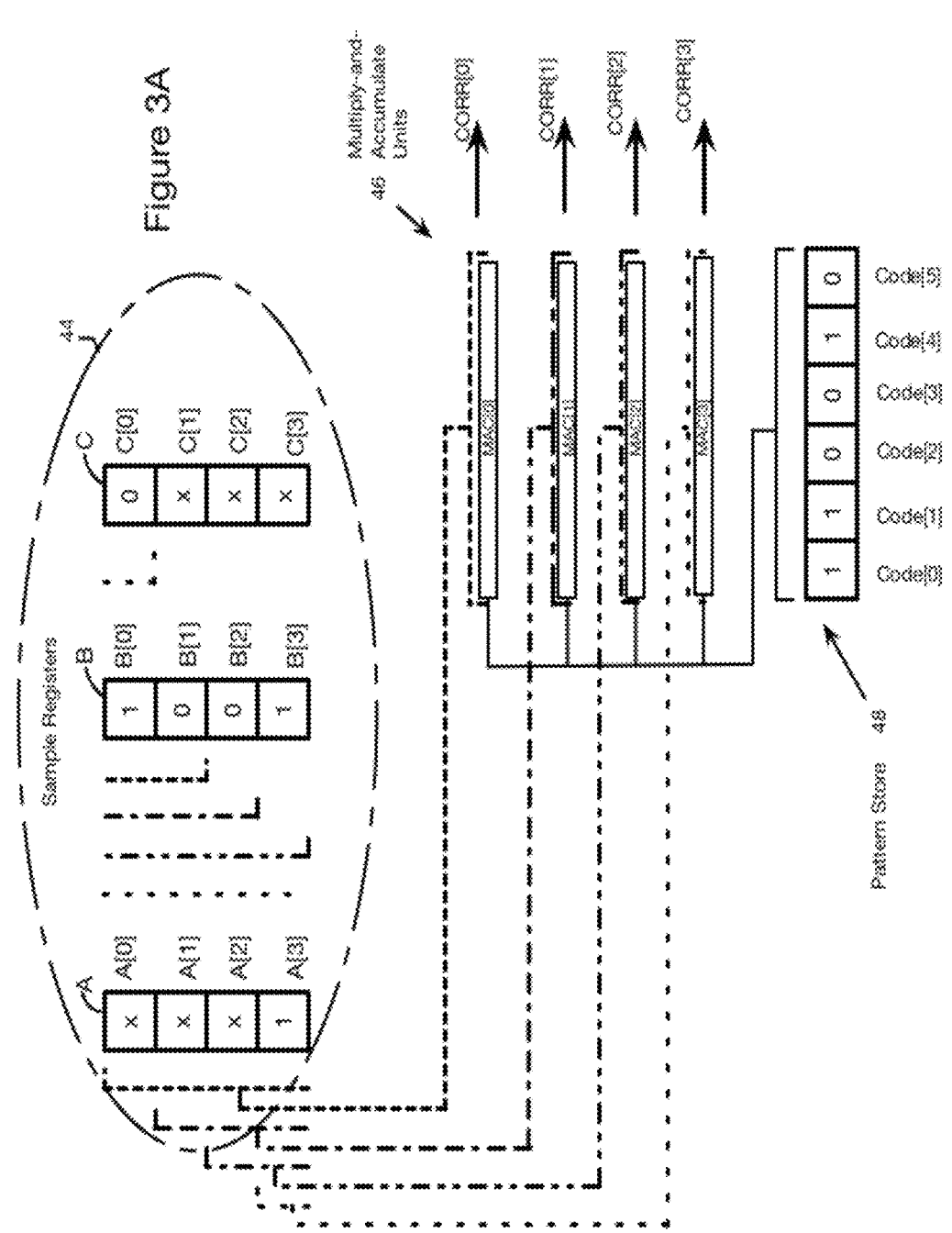

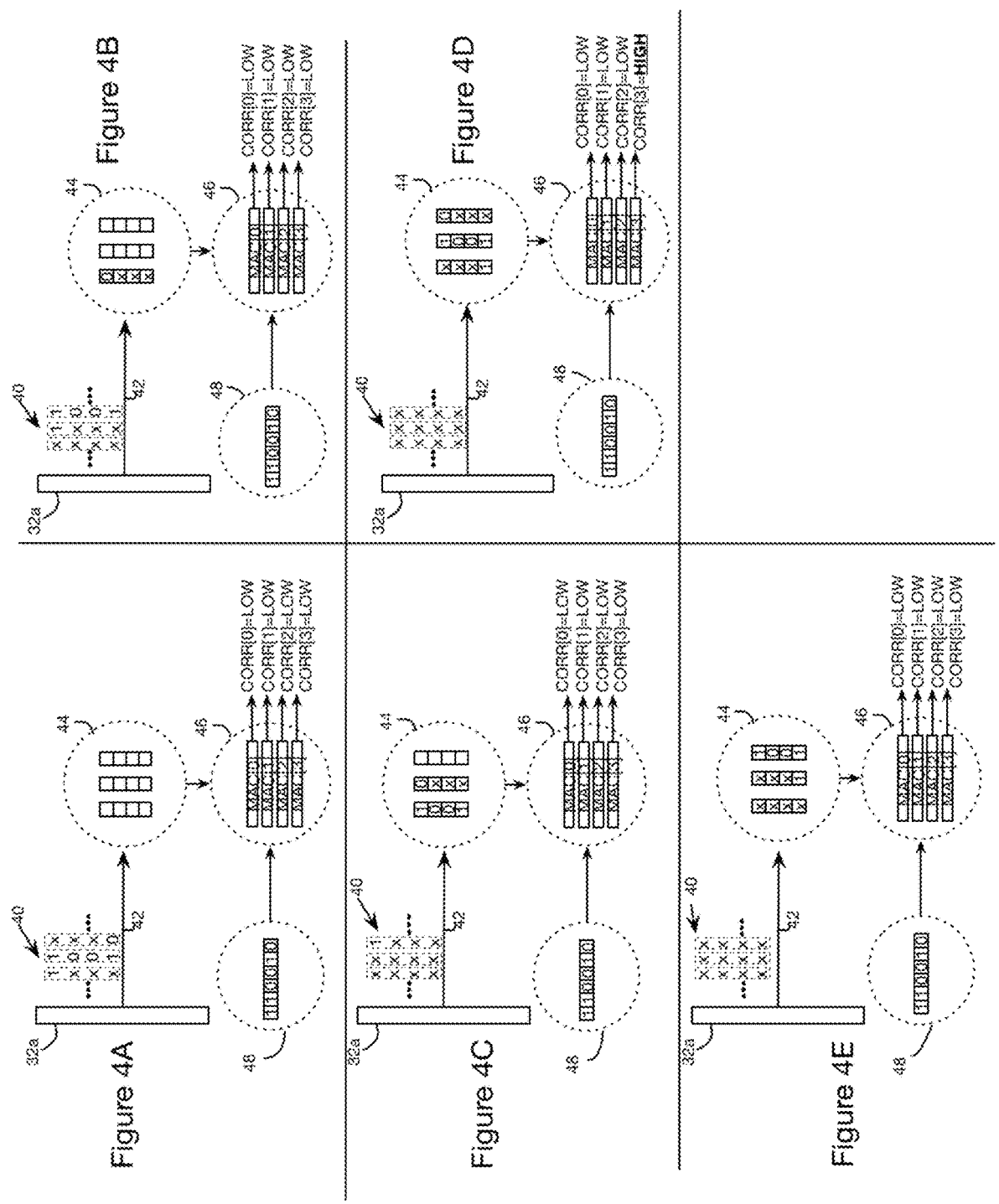

BEAM-FORMING RECONFIGURABLE CORRELATOR (PULSE COMPRESSION RECEIVER) BASED ON MULTI-GIGABIT SERIAL TRANSCEIVERS (SERDES)

This application is a continuation in part of U.S. patent application Ser. No. 15/406,113, filed Jan. 13, 2017, the teachings of which are incorporated herein by reference. This application also claims the benefit of filing of U.S. Provisional Patent Application Ser. No. 62/320,159, filed Apr. 8, 2016, entitled "A Reconfigurable Correlator (Pulse Compression Receiver) and Beam Former Based on Multi-Gigabit Serial Transceivers (SERDES)," the teachings of which are also incorporated herein by reference.

BACKGROUND OF THE INVENTION

The invention pertains to signal processing and, more particularly, to pulse compression receivers and correlators. The invention has application in RADAR, LIDAR and other range-finding systems of the type employed, by way of non-limiting example, in autonomous vehicles such as self-driving cars, as well as in wireless communications modems of the type employed, by way of non-limiting example, in Massive-MIMO (multiple-in-multiple-out) networks such as 5G wireless telecommunications, all by way of non-limiting example.

Range-finding systems use reflected waves to discern, for example, the presence, distance and/or velocity of objects. Although sound-based ranging has been used in nature for millions of years, mankind did not discover how to harness it and radio frequency-based ranging (RADAR) until the late nineteenth and early twentieth centuries. Laser-based ranging (LIDAR) followed advent of the laser itself, in the 1960's.

Fundamental to automated ranging systems is broadcasting a pulse into the environment and matching it with incoming signals to determine whether they contain reflections of the pulse off objects of potential interest. Though easily stated, the practice of this is anything but. In part, this is because the range-resolution of the reflections is inversely proportional to the transmitted pulse's bandwidth. The higher the bandwidth, the smaller (i.e., the finer) the range-resolution. While this favors short pulses (which tend to be of high bandwidth), they typically result in very complex receiver and transmitter architectures and in limited signal-to-noise ratios. (As those skilled in the art will appreciate, the signal-to-noise ratio (SNR) can be expressed by the relation SNR=Pulse energy/Noise Energy. Noise Energy, in turn, is proportional to the receiver's band-width (k×T× BW). This is why the SNR is weaker for higher band designs.) Longer pulses (which tend to be of lower bandwidth) simplify instrument design and implementation and improve signal-to-noise ratios for the same power levels, yet, with reduced resolution.

Pulse compression is a technique that gets the best of both worlds. By modulating the transmitted signal, e.g., varying the frequency within each pulse or by coding the phase of a continuous-wave signal, this technique can provide the improved signal strength of longer, lower-power pulses with the improved resolution of shorter pulses. For example, by embedding a known a-priori pattern into each pulse, the arrival time of its reflection—and, therefore, the range of the object from which that reflection has occurred—can be resolved with greater precision by finding the point of highest correlation between the pulse pattern and the incoming reflection signals. In other words, very fine range resolution can now be achieved with long pulse durations.

Although it has proven a boon to the art, pulse compression can prove expensive to implement, esp., for example, at speeds necessary to support range finding for commercial autonomous vehicle operation.

In view of the foregoing, an object of the invention is to provide improved methods and apparatus for signal processing.

Related objects are to provide improved methods and apparatus for signal correlation and for pulse compression.

A further related object of the invention is to provide such improved methods and apparatus as can be applied in range-finding, wireless communications and other applications.

A further object of the invention is to provide improved such methods and apparatus as are suitable for use with RADAR, LIDAR and other range-finding technologies.

A still further object of the invention is to provide improved methods and apparatus for transmitting and receiving pulses and their reflections in such range-finding systems.

Still yet another object of the invention is to provide an improved correlator and methods of operation thereof for use with such range-finding and other systems.

Yet still another object of the invention is to provide such an improved correlator and methods as are reconfigurable.

SUMMARY OF THE INVENTION

The foregoing are among the objects of the invention, which provides in some aspects improvements in a signal correlator of the type having logic that correlates a signal pattern with an applied signal. The improvement is characterized by a serializer/deserializer ("SERDES") having a receive side (a/k/a the "deserializer") with an input to which an "analog" signal is applied. The SERDES generates and applies to correlation logic within the correlator digital samples of the analog signal.

According to these aspects of the invention, the SERDES's deserializer operates as an ADC, that is, as an analog to digital converter. It samples the applied "analog" signal and generates a digital stream of values—each, for example, of 1-bit length—representing the amplitude of respective successive samples of the analog signal.

Related aspects of the invention provide an improved signal correlator, e.g., as described above, in which the SERDES samples the applied analog signal at a rate of at least 3 giga samples per second (GSPS) and, preferably, at a rate of at least 28 GSPS. In other related aspects of the invention, the applied analog signal is conditioned to attain a differential amplitude of at least 10 mVpp and, preferably, at least 250 mVpp.

Other aspects of the invention provide an improved signal correlator, e.g., as described above, in which the SERDES is implemented in any of a ASIC and an FPGA. Related aspects of the invention provide such a correlator that is reconfigurable. Still further related aspects of the invention provide an improved signal correlator, e.g., as described above, in which clock-tracking and correction functionality native to the SERDES (and/or the ASIC or FPGA in which it is embodied) are disabled.

According to these aspects of the invention, the signal pattern to be transmitted can be stored in a memory that is field-reprogrammable.

Further aspects of the invention provide a signal correlator, e.g., as described above, in which the correlation logic is made up of a plurality of multiply-and-accumulate (MAC) units, each coupled to receive a respective portion of the digital stream directly or indirectly (e.g., via registers associated with the MAC units) from the deserializer—that is, a respective set of successive (or substantially successive) samples of the "analog" signal. Each respective portion includes at least one sample not in the other portions, and successive portions are overlapping but offset from one another by one or more successive samples (or substantially successive samples).

The MAC units, according to related aspects of the invention, each multiply their respective portion of the digital stream, on a sample-by-sample (e.g., bit-by-bit) basis, with the signal pattern and sum results of those multiplications. In systems and methods operating in accord with these aspects of the invention, higher correlations correspond with larger sums. In alternate aspects of the invention, e.g., in which the samples are 1-bit values, each MAC unit preferably performs Boolean exclusive OR (XOR) operations, instead of multiply operations, and sums (or accumulates) results of those XOR operations. In systems and methods operating in accord with these aspects of the invention, higher correlations correspond with smaller sums (since an XOR operation produces a 0, when compared bits match, and a 1, when compared bits do not match).

Related aspects of the invention provide a signal correlator, e.g., as described above, that processes samples (e.g., from the SERDES) at a rate of at least 3 GSPS and, preferably, at a rate of at least 28 giga samples per second (GSPS).

Further aspects of the invention provide improvements to electromagnetic and other wave-based ranging systems (or range-finding systems—terms that are used synonymously herein), e.g., RADAR or LIDAR systems, of the type having transmit logic that transmits a pulse based on an applied analog signal. The improvement is characterized by a SERDES having a serializer (a/k/a a "transmit side") that is coupled to the transmit logic. The serializer has (i) an input to which a pattern on which the pulse is based is applied and (ii) an output from which a serialization of the pattern is applied to the transmit logic.

In these aspects of the invention, the SERDES's serializer operates as a DAC, that is, as a digital to analog converter. It converts the pattern into a stream of bits that are represented as positive and negative going electric voltage pulses (depending on the value of each respective bit) at the output of the serializer.

Related aspects of the invention provide improved such ranging systems, in which the SERDES performs the aforesaid conversion at a rate of at least 3 GSPS and, preferably, at a rate of at least 28 giga samples per second (GSPS).

In other related aspects, the invention provides an improved range-finding system, e.g., as described above, in which the pattern is selected so that the pulse transmitted by the transmit logic has selected autocorrelation properties. Those can be, according to further related aspects of the invention, a minimal autocorrelation amplitude at any lag other than zero. According to further related aspects of the invention, the pattern can be selected so that a pulse transmitted by the transmit logic is a pseudo-random noise sequence (PRN).

Other aspects of the invention provide an improved ranging system, e.g., as described above, in which the SERDES is implemented in any of a ASIC and an FPGA. In related aspects of the invention, the signal pattern can be stored in a memory that is field-reprogrammable and/or generated on the fly, e.g., with a Linear Feedback Shift Register (LFSR).

Still further aspects of the invention provide improvements to an electromagnetic ranging system, e.g., of the type described above, that includes (i) receive logic that receives an analog signal that is a possible reflection of the pulse and (ii) correlation logic that correlates the received signal with a pattern (or "sequence") on which the transmitted pulse is based.

The improvement is characterized in that the SERDES has deserializer logic (a/k/a a "receive side") that can operate in the manner of a deserializer as discussed above and that has (i) an input to which an analog signal (that is the possible reflection of the pulse) is applied, and (ii) an output from which a deserialization of that analog signal is applied to correlation logic—e.g., as 1-bit digital samples of the received signal.

Further aspects of the invention provide improved ranging systems that include transmit logic that transmits a pulse into the environment based on an applied signal. A SERDES is provided having a serializer with (i) an input to which a pattern is applied and (ii) an output that is coupled to the transmit logic and on which a serialization of the pattern is generated as the applied signal. The transmit logic (and its associated circuitry) includes a bootlace lens (e.g., as described in Tomar, "An overview of Design and Analysis techniques of Bootlace Lens for Multiple beamforming," IACSIT Int'l Journal of Engineering and Technology, v. 1, n. 5, December 2009, pp. 397, et seq., and elsewhere in the literature) and more particularly, according to some aspects of the invention, a Rotman lens.

Related aspects of the invention provide improved ranging systems, e.g., as described above, wherein the Rotman lens is coupled to receive the serialization, e.g., following amplification and conditioning, by way of a switch that has multiple selectable outputs, each coupled to a corresponding beam port of the lens. The switch can selectively route a radio frequency (RF) signal generated from the serialization of the pattern output by the serializer (following any of amplification and conditioning) to one or more of the beam ports of the Rotman lens.

According to related aspects of the invention, the Rotman lens has a plurality of element ports, each of which is coupled to a transmit antenna. An array comprising plural ones of the transmit antennas radiates the RF signal in a direction determined by the beam ports of Rotman lens to which the RF signal is applied.

In related aspects of the invention, the switch selectively routes the radio frequency (RF) signal to two beam ports of the Rotman lens. Circuitry interposed between each output of the switch and each corresponding beam port of the Rotman lens can vary a phase of the signals transferred therebetween.

In other aspects, the invention provides a ranging system, e.g., of the type described above, that has a plurality of receive sections, each with receive logic that receives from the environment an analog signal that is a possible reflection of a pulse from an object. A SERDES within each such section has a deserializer that is coupled to the receive logic of the respective section and that generates a stream of digital samples of the analog signal received thereby. A correlator within each section correlates that stream against a pattern on which the transmitted pulse is based.

Related aspects of the invention provide a ranging system, e.g., of the type described above, comprising range-finding logic that is coupled to the correlators of the plurality of receive sections. The range-finding logic can determine any of a distance, velocity, bearing, doppler, and/or absolute or relative position of an object from which a pulse transmitted by the transmit logic and received by the receive sections is reflected.

The deserializers can sample the applied analog signals at rates in accord with previously-discussed aspects of the invention, e.g., at rates between of at least 3 gigasamples per second (GSPS) and/or of at least 28 gigasamples per second (GSPS). And, as discussed in accord with previously-discussed aspects of the invention, the SERDES can be implemented ASICs or FPGAs.

Still other aspects of the invention provide ranging systems, e.g., as described above, in which the correlators comprise multiply-and-accumulate units, e.g., as described previously.

Other aspects of the invention provide a ranging system that includes a plurality of transmit antennas that transmit a pulse into the environment. One or more SERDES's, each having a serializer with an input to which a pattern is applied, each have an output on which a serialization of the pattern is generated and that is coupled to one or more of the transmit antennas. Transmit logic is coupled between the one or more SERDES's and the plurality of transmit antennas to directionally steer the pulse transmitted thereby.

Yet still other aspects of the invention comprise a ranging system, e.g., as described above, that includes a plurality of receive antennas that receive from the environment a possible reflection of a pulse. One or more SERDES's, each having a deserializer with an input that is coupled to the one or more of the receive antennas, each have an output on which a stream of digital samples of analog signals representing possible pulse reflections are generated. One or more correlators that are coupled to the outputs of the one or more of the deserializers to correlate the stream generated thereby against a pattern on which the transmitted pulse is based.

Still other aspects of the invention provide a ranging system that includes a plurality of transceiver sections, each of which has transmit logic that transmits a pulse based on an applied analog signal and receive logic that receives an analog signal that is a possible reflection of the pulse. A SERDES provided in each such section has a serializer that is coupled to the transmit logic of that respective transceiver section and a deserializer logic that is coupled to the receive logic of that respective transceiver section. Each serializer has an input to which the pattern is applied and an output from which a serialization of the pattern is applied to the transmit logic of that respective transceiver section. Each deserializer has an input to which the analog signal that is a possible reflection of the pulse is applied, the deserializer generating digital samples of the analog signal received by the receive logic of that respective transceiver section. Delay logic is provided to delay at least one of (a) transmission of pulses into the environment by the transmit logic of that respective transceiver section, and (b) digital samples of analog signals received by the receive logic of that respective transceiver section. A summation element is coupled to the transceiver sections and sums digital samples received therefrom. A correlator is coupled to the summation element and that correlates sums generated by the summation element against the pattern on which the transmitted pulses are based.

Related aspects of the invention provide ranging systems, e.g., as described immediately above, in which correlation is performed before summation. In these aspects, a correlator is provided in each transceiver section downstream of the deserializers (and upstream of the delay elements, if any) in order to match the digital samples against the patterns on which transmitted pulses are based. Summation element(s), according to these aspects, is/are coupled to the transceiver sections to sum the (corresponding) correlator outputs.

Further aspects of the invention provide an improved ranging system that has a plurality of transmit logic subsections that each transmits a pulse based on an applied analog signal, and a plurality of SERDES's, each having a serializer that is coupled to a respective transmit logic subsection. Each serializer has an input to which the pattern is applied and an output from which a serialization of the pattern is applied to the respective transmit logic subsection. Delay logic delays transmission of pulses into the environment by the respective transmit logic subsection.

Related aspects of the invention provide an improved ranging system, e.g., as described above, that includes control logic that is coupled to the delay logic that varies a delay interval imposed on transmission of pulses by its respective transmit logic subsection. The control logic can vary the delay intervals in order to steer an effective direction at which the bit-patterns are transmitted into the environment.

Other aspects of the invention provide an improved ranging system having a plurality of receive logic subsections that each receive an analog signal from the environment that is a possible reflection of a pulse from an object, and a plurality of SERDES's, each with a deserializer that is coupled to a respective receive logic subsection. Each deserializer has an input to which the analog signal that is a possible reflection of the pulse is applied, the deserializer generating digital samples of the analog signal received by the receive logic of that respective transceiver section. A summation element is coupled to the receive logic subsections that sums digital samples received therefrom. Delay logic delays transfer of digital samples from the respective receive logic subsections to the summation element. Related aspects of the invention provide such a ranging system in which correlation is performed before summation, e.g., as discussed previously.

Related aspects of the invention provide an improved ranging system, e.g., as described above, that includes a correlator coupled to the summation element and that correlates sums generated by the summation element against the pattern on which transmitted pulses are based. Control logic that is coupled to the delay logic can vary a delay interval imposed in the delay of transfer of digital samples from the respective receive logic subsections to the summation element in order to steer directional sensitivity to the analog signals received by the receive logic subsections from the environment that are possible reflections of pulses from an object.

Still other objects of the invention provide methods for operating correlators and electromagnetic and other wave-based ranging systems as described above.

BRIEF DESCRIPTION OF THE DRAWINGS

A more complete understanding of the invention may be attained by reference to the drawings, in which:

FIG. 3A depicts a search for a match between buffered input samples and a sequence (pattern) in a correlator of FIG. 2;

FIGS. 4A-4E depict operation of a correlator of FIG. 2;

DETAILED DESCRIPTION OF THE ILLUSTRATED EMBODIMENT

Figure 1:
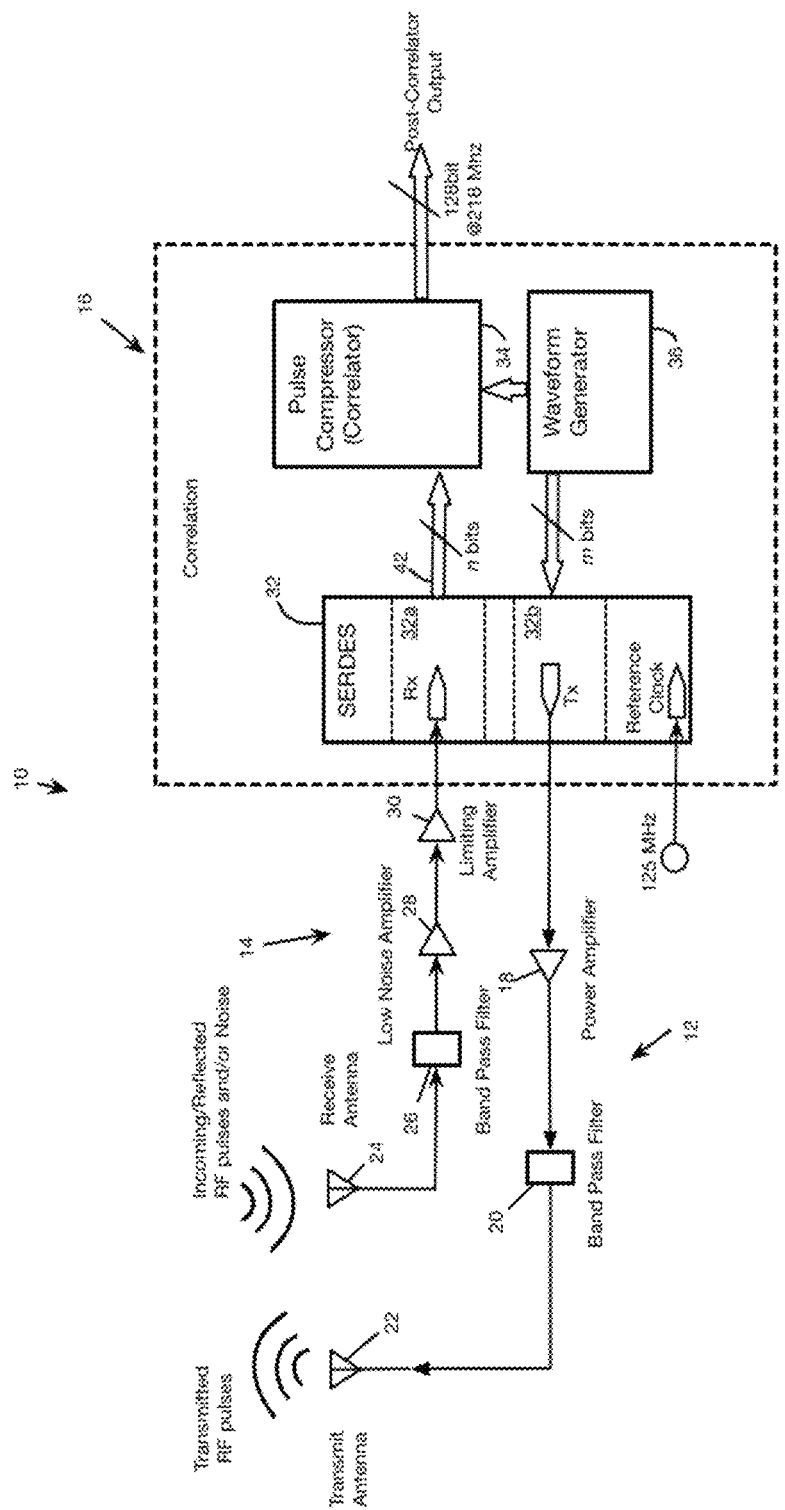
FIG. 1 depicts a range-finding system according to one practice of the invention.

FIG. 1 depicts a range-finding (or "ranging") system 10 according to one practice of the invention. The illustrated system determines the presence, distance, velocity and/or other characteristics of objects using radio frequency pulses, i.e., RADAR; however, it will be appreciated that the teachings hereof are equally applicable to systems that use light-based pulses (LIDAR) and/or that use other forms of waves, such as sound (SONAR). Applications of the illustrated system 10 include, among many others, autonomous and semi-autonomous vehicle guidance (e.g., "self-driving" cars).

Parameters of the illustrated embodiment center around such an application in the discussion below. It will be appreciated that this is by way of example, and that other embodiments—regardless of whether intended for use in supporting such guidance or other applications and regardless of whether utilizing RF or other pulse forms—may employ the same or other operational and design parameters.

Illustrated system 10 includes transmit logic 12, receive logic 14 and correlation logic 16, interconnected as shown in the drawing and further described below.

Transmit Logic

Transmit logic 12 comprises componentry of the type known in the art for use with RADAR systems (and particularly, for example, in pulse compression RADAR systems) to transmit into the environment or otherwise a pulse based on an applied analog signal. In the illustrated embodiment, this is shown as including a power amplifier 18, band pass filter 20 and transmit antenna 22, connected as shown or as otherwise known in the art.

Illustrated elements 18-22 are of the type known in the art of RF pulse transmission, e.g., in RADAR applications, and are selected and configured in the conventional manner known in the art for conditioning the applied signal and transmitting pulses based thereon in accord with a desired application (albeit, as adapted in accord with the teachings hereof).

The components of transmit logic 12 shown here are by way of example. It will be appreciated that other componentry within the ken of those ordinarily skilled in the art suitable for transmission of radio frequency pulses may be used instead or in addition. Moreover, it will be appreciated that alternate componentry, also within the ken of those ordinarily skilled in the art, may be used for embodiments based on LIDAR, SONAR or other wave-based ranging.

Receive Logic

Receive logic 14 comprises componentry of the type known in the art for use with RADAR systems (and particularly, for example, in pulse compression RADAR systems) to receive from the environment (or otherwise) incoming analog signals that represent possible reflections of a transmitted pulse. In point of fact, those signals may often include (or solely constitute) noise. In the illustrated embodiment, the receive logic includes receive antenna 24, band pass filter 26, low noise amplifier 28, and limiting amplifier 30, connected as shown or as otherwise known in the art.

Illustrated elements 24-30 are of the type known in the art of RADAR reception and are selected and configured in the conventional manner known in the art for conditioning incoming signals that contain possible pulse reflections, as well, typically, as noise (all as adapted in accord with the teachings hereof).

The components of receive logic 14 shown here are by way of example. It will be appreciated that other componentry within the ken of those ordinarily skilled in the art suitable for reception of reflected radio frequency pulses may be used instead or in addition. Moreover, it will be appreciated that alternate componentry, also within the ken of those ordinarily skilled in the art, may be used for embodiments based on LIDAR, SONAR or other wave-based ranging.

Correlation Logic

Correlation logic 16 correlates the incoming signals, as received and conditioned by the receive logic 14, with the pulse transmitted by the transmit logic 12 (or, more aptly, in the illustrated embodiment, with the patterns on which that pulse is based) in order to find when, if at all, there is a high correlation between them. Illustrated correlation logic comprises serializer/deserializer (SERDES) 32, correlator 34 and waveform generator 36, coupled as shown (e.g., by logic gates of an FPGA or otherwise) or as otherwise evident in view of the teachings hereof.

Each of elements 32-36 may be stand-alone circuit elements; alternatively, one or more of them may be embodied in a common FPGA, ASIC or otherwise. Moreover, elements 32-36, or any one or more of them, may be embedded on a common FPGA, ASIC or other logic element with one or more of the other elements discussed above, e.g., elements 12-30. When embodied in FPGAs, ASICs or the like, the elements 32-36 provide for sampling and processing of incoming signals at rates of at least 3 giga samples per second (GSPS) and, preferably, at a rate of at least 28 GSPS.

Waveform Generator

The waveform generator 36 generates a multi-bit digital value of length m (which can be, for example, a byte, word, longword or so forth) embodying a pattern on which pulses transmitted by transmit logic 12 are (to be) based. In some implementations, this is a static value. In others, it is dynamic in that it changes periodically or otherwise.

An example of a multi-bit value—or "bit pattern"—generated by the generator 36 is a digital value such as "111000110010," where the 1's indicate when the pulse is "on," and the 0's indicate when the pulse is "off." The pattern embodied in this digital value defines a "chirp" pulse, that is, a pulse that is "on" and "off" for shorter and shorter time periods—here, for illustrative purposes only, on for three ticks, off for three ticks, on for two ticks, off for two ticks, on for one tick and off for one tick (all by way of example), where "tick" refers to a moment of generic length (e.g., a microsecond, a millisecond or so forth).

An example of a dynamic value is a value from a pseudo random noise sequence (PRN), although, those skilled in the art will appreciate that other dynamic values, e.g., with suitable autocorrelation properties, can be used instead or in addition.

The waveform generator 36 can comprise a register (not shown) or other logic suitable for holding the aforesaid multi-bit digital value and applying it to the input of the serializer 32b, as discussed below. That register can comprise, for example, a ROM, and EEPROM or the like, that can be programmed, e.g., "at the factory," "at the shop" or upon other operator action. Alternatively, it can be general- or special-purpose logic (not shown) such as a Linear Feedback Shift Register (LFSR) that changes the value on the fly, e.g., as in the case of a PRN or other dynamic multi-bit digital value, on user request or otherwise. Such general- or special-purpose logic can be implemented, whether in an FPGA, ASIC or otherwise, utilizing skills within the ken of those of ordinary skill in the art in view of the teachings hereof.

Serializer/Deserializer (SERDES)

The illustrated logic 16 includes a serializer deserializer 32 (SERDES) of the type known in the art, as adapted in accord with the teachings hereof. SERDES 32 may be a stand-alone electronic circuit element or one that is embedded, e.g., as an interface unit, in a general- or special-purpose circuit element, e.g., a field programmable gate array (FPGA), an application specific integrated circuit (ASIC), and so forth. In the illustrated embodiment, SERDES 32 is shown as forming part of the correlation unit 16, e.g., along with the pulse compressor 34 and waveform generator 36, and, indeed, in some embodiments, those units reside on a common FPGA (or ASIC). In other embodiments the SERDES 32 may be packaged separately from one or both of those units 34, 36.

As per convention, SERDES 32 includes a deserializer 32a (a/k/a a "receive side") and a serializer 32b (a/k/a a "transmit side"), each with an input and an output. Those inputs and outputs may be leads (e.g., in the case of a stand-alone SERDES), logic paths (in the case of a SERDES embedded in an FPGA) or the like, as is common in the art.

Deserializer

The deserializer 32a is of the type commonly known in the art for accepting a digital signal at its input and converting it to a digital signal of another format at its output, e.g., by "parallelizing" (a/k/a "deserializing") or grouping bits that make up the input signal (for example, converting a stream of bits into a byte, word or longword).

Figure 2:
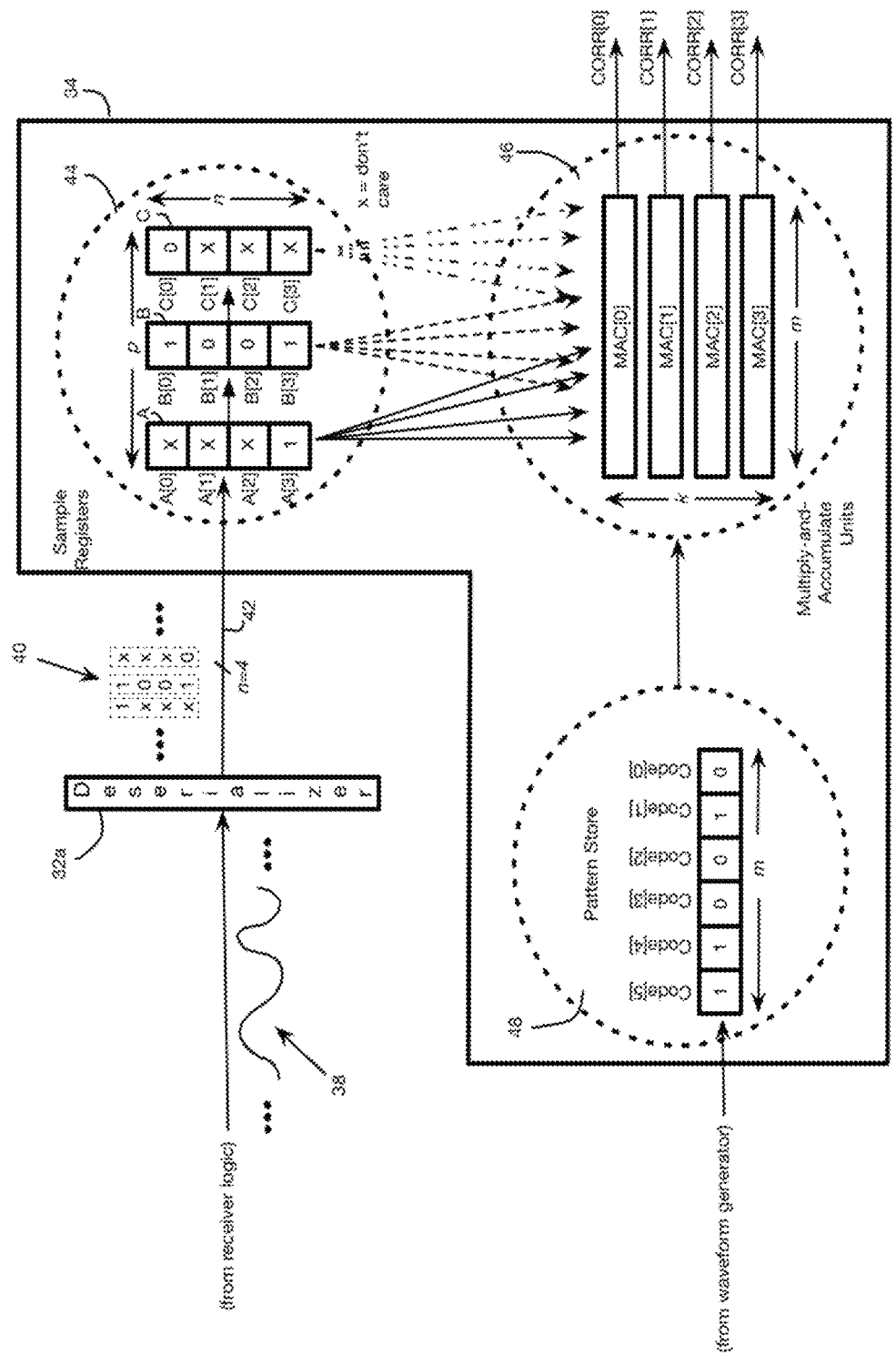
FIG. 2 depicts operation of a correlator in a system of FIG. 1.

The deserializer 32a is coupled to receive logic 14, e.g., as shown in FIGS. 1 and 2, to accept as input signals 38 representing possible reflections of the pulse from objects in the range and path of the range-finding system 10. Those signals 38 might conventionally be considered to be "analog" signals (and are shown as such in FIG. 2) given the manner in which they are received from the environment and processed by the elements of the receive logic 14—esp., for example, in a system 10 in which elements 18-22 are of the type known in the art of RADAR.

The deserializer 32a, however, accepts those "analog" signals at its input as if they were digital and, particularly, in the illustrated embodiment, as if they were a stream of bits, and it groups those bits, e.g., into longwords, at its output. As used herein, the term "longword" refers not only to 32-bit words, but to any multi-bit unit of data. In some preferred embodiments, these are 128-bit words (a/k/a "octawords" or "double quadwords"), but in other embodiments they may be nibbles (4 bits), bytes (8 bits), half-words (16 bits), words (32 bits) or any other multi-bit size.

The deserializer 32a of the illustrated embodiment, thus, operates as a 1-bit ADC (that is, as an analog to digital converter) that, in effect, samples and converts an incoming "analog" signal (received at its input) representing possible reflections of the pulse into a stream of longwords (produced at its output), where the sampling is only for two amplitudes: high (amplitude 1) and low (amplitude 0). The longwords in that stream, thus, embody bit-patterns representing those possible reflections.

Figure 5:
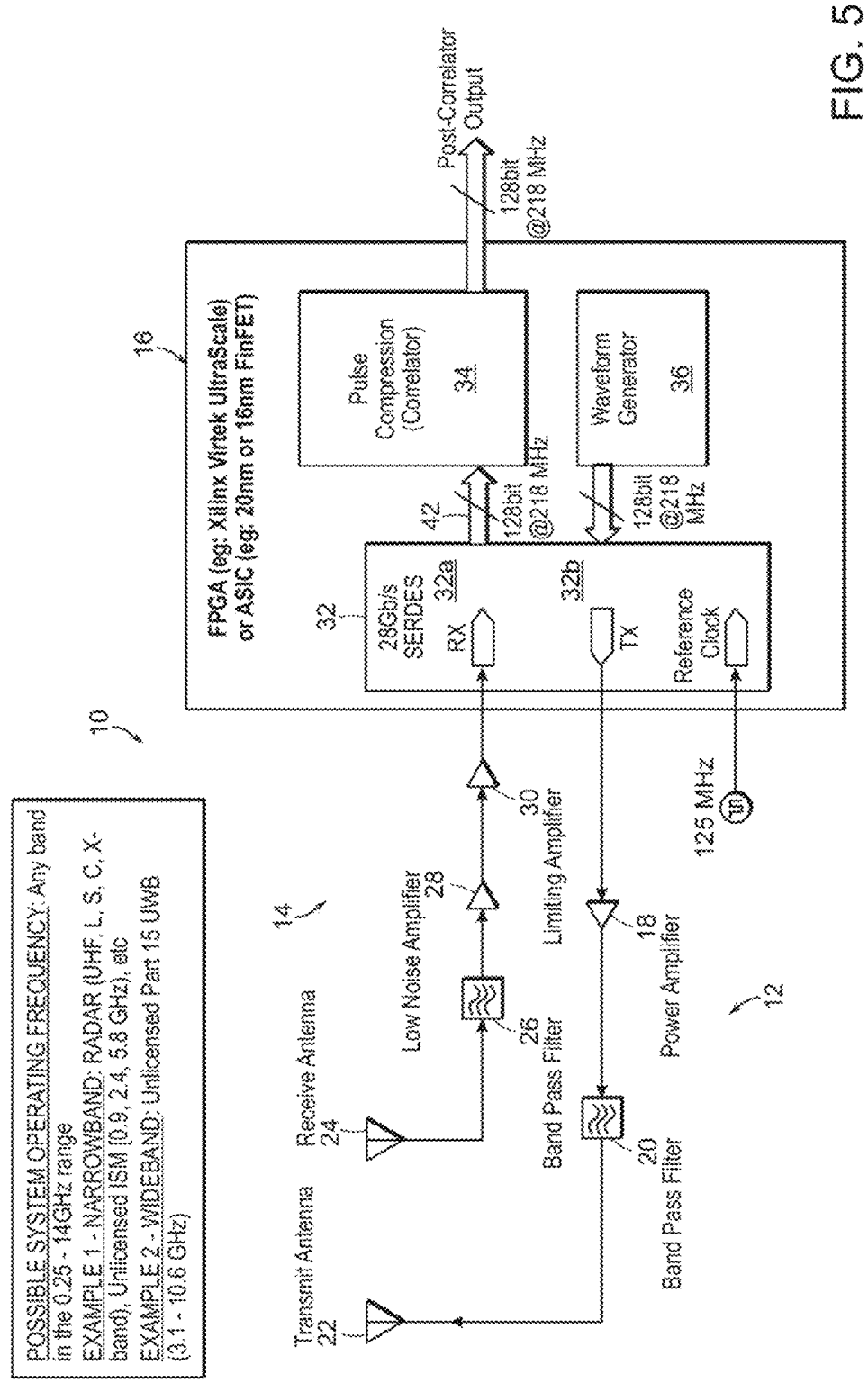
FIGS. 5 and 6 depict, respectively, embodiments of the invention in direct-to-radio frequency and heterodyne—BPSK modulation RADAR applications.

In the embodiment shown in FIG. 2, the deserializer 32a samples and converts (groups) the input signal 38 into a digital stream 40 of 4-bit "longwords" (more properly, "nibbles"), as shown. A circuit path 42 having a width n that, typically, matches the size of those longwords (here, n=4) carries those longwords to registers in the correlator 34. (In some preferred embodiments, such as illustrated in FIG. 5, et seq., the longwords are 128 bits long and path 42 is 128 bits wide, by way of non-limiting example.) As will be appreciated, each successive bit stored in the longwords represents the amplitude of the input signal 38 at a different respective time.

Serializer

Like the deserializer 32a, the serializer 32b is of the type commonly known in the art for accepting a digital signal at its input and converting it to a digital signal of another format at its output, e.g., by serializing or un-grouping bits that make up the input signal (for example, converting an byte, word or longword into a stream of its constituent bits).

The input of the serializer 32b is coupled to the waveform generator 36, which applies to that input a word, long word or other multi-bit digital value embodying a pattern on which pulses transmitted by transmit logic 12 are (to be) based. The serializer 32b serializes or ungroups the multi-bit value at its input and applies it, e.g., as a stream of individual bits, to the transmit logic 12 and, more particularly, in the illustrated embodiment, the power amplifier 18, to be transmitted as a pulse into the environment or otherwise.

Those skilled in the art will appreciate that an analog signal would conventionally be applied to transmit logic 12 for this purpose. The serializer 32b, however, applies its digital output to the logic 12 (here, particularly, the amplifier 18) to be treated as if it were analog and to be transmitted into the environment or otherwise as pulses.

The serializer 32b of the illustrated embodiment, thus, effectively operates as a 1-bit DAC (digital to analog converter) that converts a digital signal applied to it by the waveform generator 36 into a stream of individual bits and that it applies to the transmit logic 12 as if it were an analog signal for amplification and broadcast as pulses by the transmit antenna 22.

Correlator

The correlator 34 correlates the bit-pattern that is embodied in the multi-bit digital value from waveform generator 36 embodying the pattern(s) on which pulses transmitted by transmit logic 12 are based with the bit-patterns representing possible reflections of the pulse embodied in digital stream of longwords produced by the deserializer 32a from the input signal 38. To this end, the correlator 34 searches for the best match, if any, of the pulse bit-pattern (from generator 36) with the bit-patterns embodied in successive portions of the digital stream (from the deserializer 32a) stored in registers that form part of the correlator (or otherwise).

Referring to FIG. 2, in the illustrated embodiment, the correlator 34 comprises sample registers 44, multiply and accumulate (MAC) units 46, and store 48 for the pulse bit-pattern (from generator 36) coupled as shown (e.g., by logic gates of an FPGA or otherwise) or otherwise evident in view of the discussion herein. Each of the elements 44-48 may be stand-alone circuit elements; alternatively, one or more of them may be embodied in a common FPGA, ASIC or otherwise. Moreover, elements 44-48, or any one or more of them, may be embedded on a common FPGA, ASIC or other logic element with the SERDES 32 and/or one or more of the other elements discussed above, e.g., elements 12-30.

Sample Registers

Sample registers 44 store (or "buffer") longwords from the digital stream 40 produced by deserializer 32a long enough that the bit-patterns they contain (representing possible reflections of pulses received by logic 14) can be compared against the pulse bit-pattern (from generator 36). In the illustrated embodiment, a plurality, p, of registers are provided (here, labeled A, B and C). For efficiency, each is sized to accommodate the bits of a single longword output by deserializer 32a in individual 1-bit storage elements (here, labeled A[0] . . . A[3], B[0] . . . B[3], and C[0] . . . C[3]). Thus, for example, where circuit path 42 is of width n (e.g., 4 bits, 128 bits, or so forth), registers 44A-44C are each of that same length n. In other embodiments, the registers may be sized differently, e.g., so that more than one of them is required to accommodate the bits of a single longword output by deserializer 32a or, conversely, so that multiple such longwords are required to fill a single register.

The registers 44, which can be embodied in a stand-alone or common circuit element (as noted above), can be implemented as shift registers (or otherwise) so that each longword received from deserializer 32a via path 42 goes from register A to register B and, then, to register C, with each clock or processing cycle (or otherwise).

In the illustrated embodiment, p is defined by the expression: $p \geq 1 + \text{roundup}((m-1)/n)$, where m and n are defined as discussed above. Selecting p in this manner insures that a sufficient number of longwords are buffered in the registers 44 to permit the MAC units 46 to find a best match, if any, of the pulse bit-pattern (from generator 36) with bit-patterns in the digitized possible reflections (from deserializer 32a), even if those reflections do not fall on longword boundaries.

Multiply and Accumulate Units

Multiply and accumulate (MAC) units 46 are coupled to respective sets of the elements that make up registers 44 to receive successive respective portions of the digital stream 40, as well as to the pattern store 48 to receive the bit-pattern stored in it. Each such portion of the digital stream 40 comprises successive samples of the input signal 38 and includes at least one sample not in the other portions. The successive portions are overlapping but offset from one another by one or more successive samples.

The foregoing is illustrated in FIG. 3A, showing MAC[0] coupled via logic gates of an FPGA, via hardwiring, or otherwise, to elements A[0], A[1], A[2], A[3], B[0], and B[1] of registers 44; MAC[1] likewise coupled to elements A[1], A[2], A[3], B[0], B[1] and B[2]; MAC[2] to A[2], A[3], B[0], B[1], B[2], and B[3]; and, MAC[3] to A[3], B[0], B[1], B[2], B[3] and C[0]. (Those MAC units 46 are also coupled, again, via logic gates of an FPGA, via hardwiring, or otherwise, to pattern store 48, as shown).

Figure 3B:
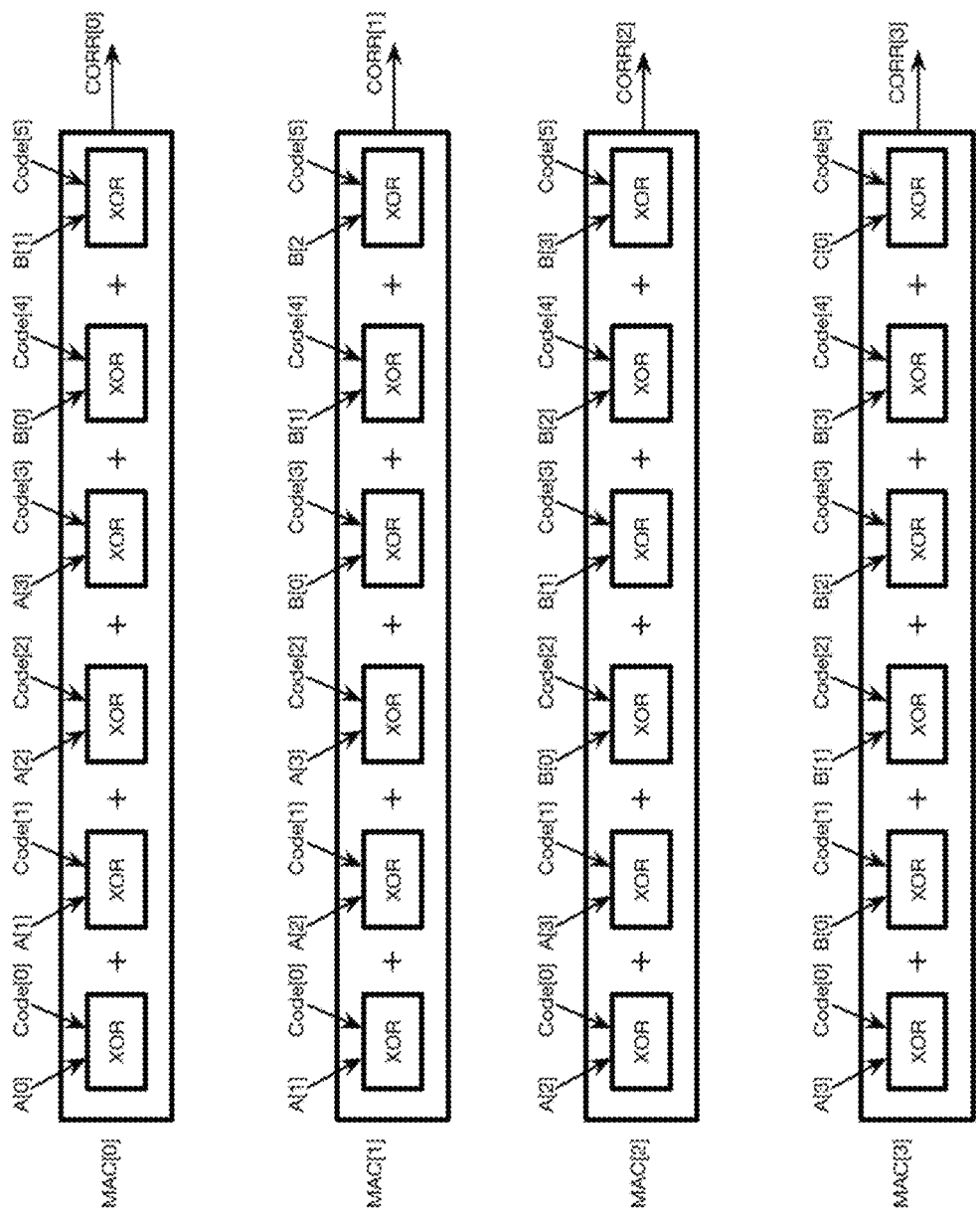
FIG. 3B depicts multiply-and-accumulate (MAC) units in a correlator of the type shown in FIG. 2.

With reference to FIG. 2, each illustrated MAC unit (i) multiples, on a bit-by-bit basis, the values of the respective portion of the digital stream 44 buffered in the elements of the registers 44 to which that MAC unit is coupled with the bit-pattern that is embodied in the multi-bit digital value from waveform generator 36, and (ii) sums the results of those multiplications. As discussed below, the bit-pattern from the waveform generator is used for the multiplications in some embodiments of the invention. Construction of the MAC units 46 is illustrated in greater detail in FIG. 3B, showing an embodiment in which XOR operations are utilized in place of multiplication operations.

An output generated by each MAC based on that sum indicates the degree of correlation between the respective portion of the digital stream—and, thereby, a respective sampling of possible reflections of pulses received by receive logic 14—with the bit-pattern on which the pulses transmitted by logic 12 were based. Those outputs are labeled CORR[0] . . . CORR[3] in the drawings.

In the illustrated embodiment a plurality, k, of MAC units are provided. They are labeled, here, MAC[0] . . . MAC[3], and each is sized to accommodate m logic elements for multiplying (or, alternatively, as discussed below, performing XOR operations on) the m bits of the multi-bit digital value from waveform generator 36 with m bits of the respective portion of the digital stream.

The MAC units, which can be embodied in a stand-alone or common circuit element (as noted above), can be of the type commonly known in the art which multiply and sum their respective inputs. In such embodiments, a larger output is indicative of a higher degree of correlation. In embodiments, such as those illustrated in FIG. 3B for use where the correlations are between bit-patterns, the MAC units are implemented as Boolean exclusive OR operations (XORs). Since an XOR operation has a value of 0 if the compared bits match, a smaller output is indicative a higher degree of correlation. As discussed below, the bit-pattern from the waveform generator is used for the XOR operations in some embodiments of the invention.

The value k is defined by the following expression, in the illustrated embodiment: $k=n$, if $m \leq n$; else $k=\text{rounddown}(n/m)$. Selecting k in this manner insure a sufficient number of MAC units to find a best match, if any, of the pulse bit-pattern (from generator 36) with the successive portions of bit-patterns in the digitized possible reflections (from deserializer 32a), even if they do not fall on longword boundaries.

Through the foregoing arrangement, the MAC units 46 are able to correlate the pulse bit-pattern (from generator 36) with pulses represented in bit-patterns in the digital stream of (digitized) possible reflections (from deserializer 32a), even if those pulses do not fall on longword boundaries. Each successive sample stored in the registers 44 (and utilized by the MAC units) represents the amplitude of the input signal 38 at a different respective time. Once a correlation of sufficiently high degree is found, the time of receipt of the respective portion of the input signal 38 can be determined computationally (based on clock timings of circuitry that implements the deserializer 32a and correlation logic 34) or otherwise.

In the illustrated embodiment, the portions of the digital stream (stored in the registers 44) upon which the respective MAC units 46 operate comprise sets of immediately adjacent samples from the longwords in stream 40. In other embodiments, they may comprise substantially adjacent samples, e.g., every other sample from the digital stream, two out of every three samples, and so forth, without departing from the spirit hereof. Likewise, although in the illustrated embodiment, the successive portions of the digital stream are offset from one another by only one sample, in other embodiments, they may be offset by two or more samples, again, without departing from the spirit hereof.

Bit Pattern Store

The MAC units 46 can be coupled directly to the generator 36 to receive the multi-bit value from it. In the illustrated embodiment, however, the MAC units receive that value from store 48 which, in turn, receives the value from generator 36. The store 48 of the illustrated embodiment, which may be coupled to generator 36 as shown, is of length m, matching that of the digital value(s) generated by the generator 36. Its elements are labeled Code[0] . . . Code[5], here, respectively. The store 48 can be embodied in a stand-alone or common circuit element as noted above. In some embodiments, the store 48 holds a time-reversed value of the multi-bit value from the generator 36 for use in multiplication or XOR operations by the MAC units.

Operation

Operation of the correlation logic 34 is depicted in FIGS. 4A-4E and described below.

As shown in FIG. 4A, the deserializer 32a generates a digital stream 40 comprising longwords—here, nibbles—comprised of 1's and 0's, each representing the amplitude of a respective sample of the input signal 38 received by logic 12 containing possible pulse reflections. (X's are shown here and in the other drawings to indicate "don't care" with respect to the illustration; in practice, these would be 1's or 0's as well.) Registers 44 are shown as empty in FIG. 4A; though, in practice, they will likely be filled with previously-acquired samples. Store 48 can be pre-loaded with the (time-reversed) pulse bit-pattern value received from waveform generator 36, as shown in the drawing. MAC units 46 can also default to outputting default values of LOW, indicating that there is no correlation between elements of the registers 44 associated with each of those units 46 and the bit-pattern in store 48.

FIG. 4B illustrates a next clock or other processing cycle of operation of logic 34. Here, a first-generated one of the longwords in the digital stream 40 is loaded into the first of the shift registers (register A). The MAC units 46 continue to emit a LOW value output, as above, since there remains no correlation between the elements of the registers 44 associated with each of those units 46 and the bit-pattern in store 48.

FIGS. 4C-4E illustrate the next several clock or processing cycles of operation of logic 34. With each cycle, the contents of the shift registers 44 are shifted from one register to the next, i.e., from register A to register B and, then, to register C, and a new longword from the digital stream 40 is loaded into the first shift register, A. As the contents are shifted, each MAC unit 46 recomputes the correlation between the elements of the registers 44 associated with that unit 46 and the (time-reversed) bit-pattern in store 48.

The MAC units 46 continue to output LOW values, except, during the cycle associated with FIG. 4D. There, MAC[3] is shown as outputting a HIGH value, indicating correlation between the bit-pattern "110010" in store 48 and the pattern "110010" stored in the register elements A[3], B[0], B[1], B[2], B[3] and C[0] associated with that MAC unit (that association is discussed above, and shown in FIGS. 3A and 3B).

Logic that forms part of the range-finding system 10 of which the correlation logic is part can respond to that HIGH value by determining (e.g., as discussed above) the time of receipt of that portion of the input signal 38 containing pulse reflections from which the correlation resulted and, from that, the presence, distance and/or velocity of objects which caused those reflections. The logic required for making such a determination is within the ken of those skilled in the art in view of the teachings hereof.

Examples

Figure 6:
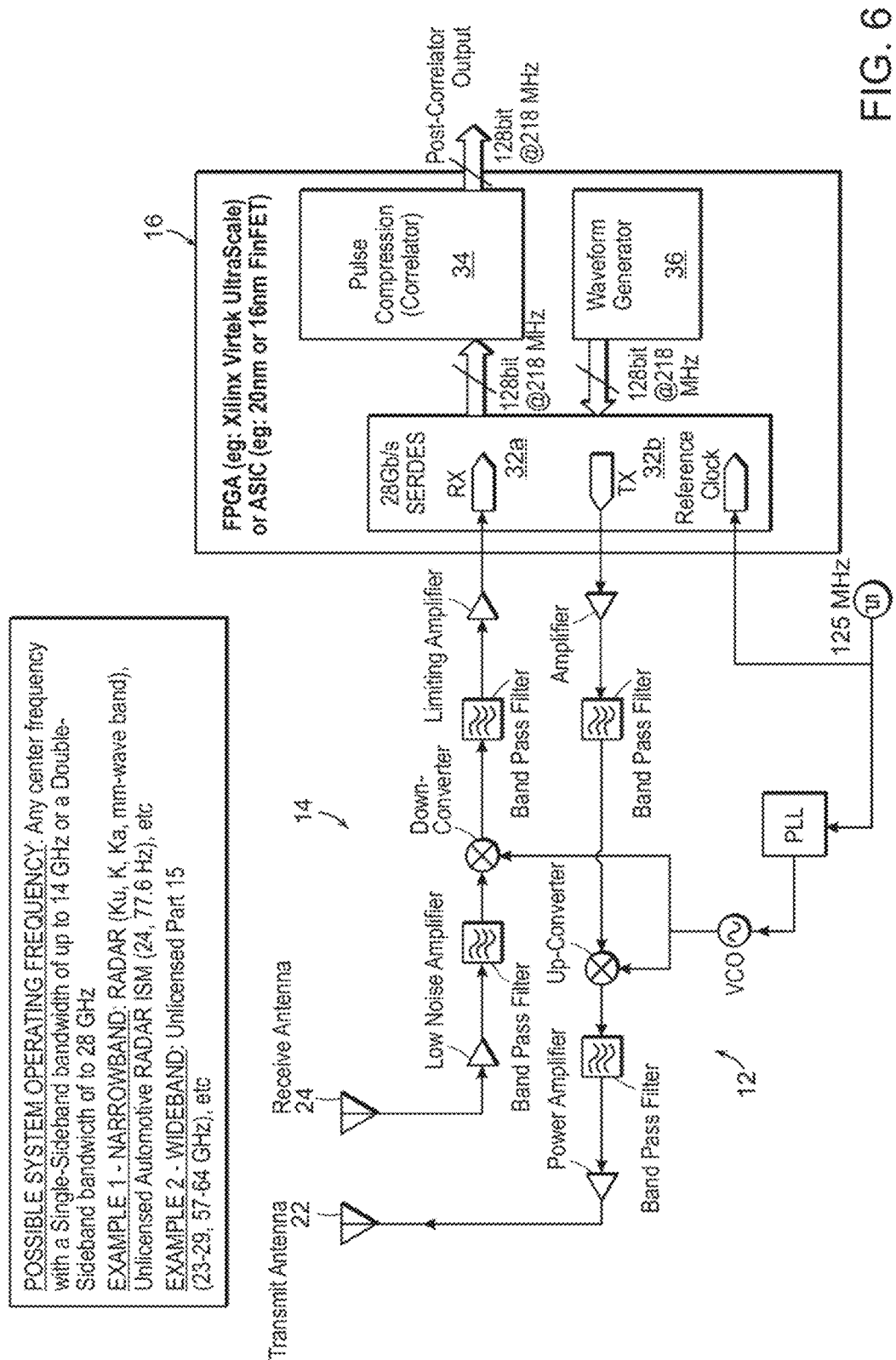
Figure 7:
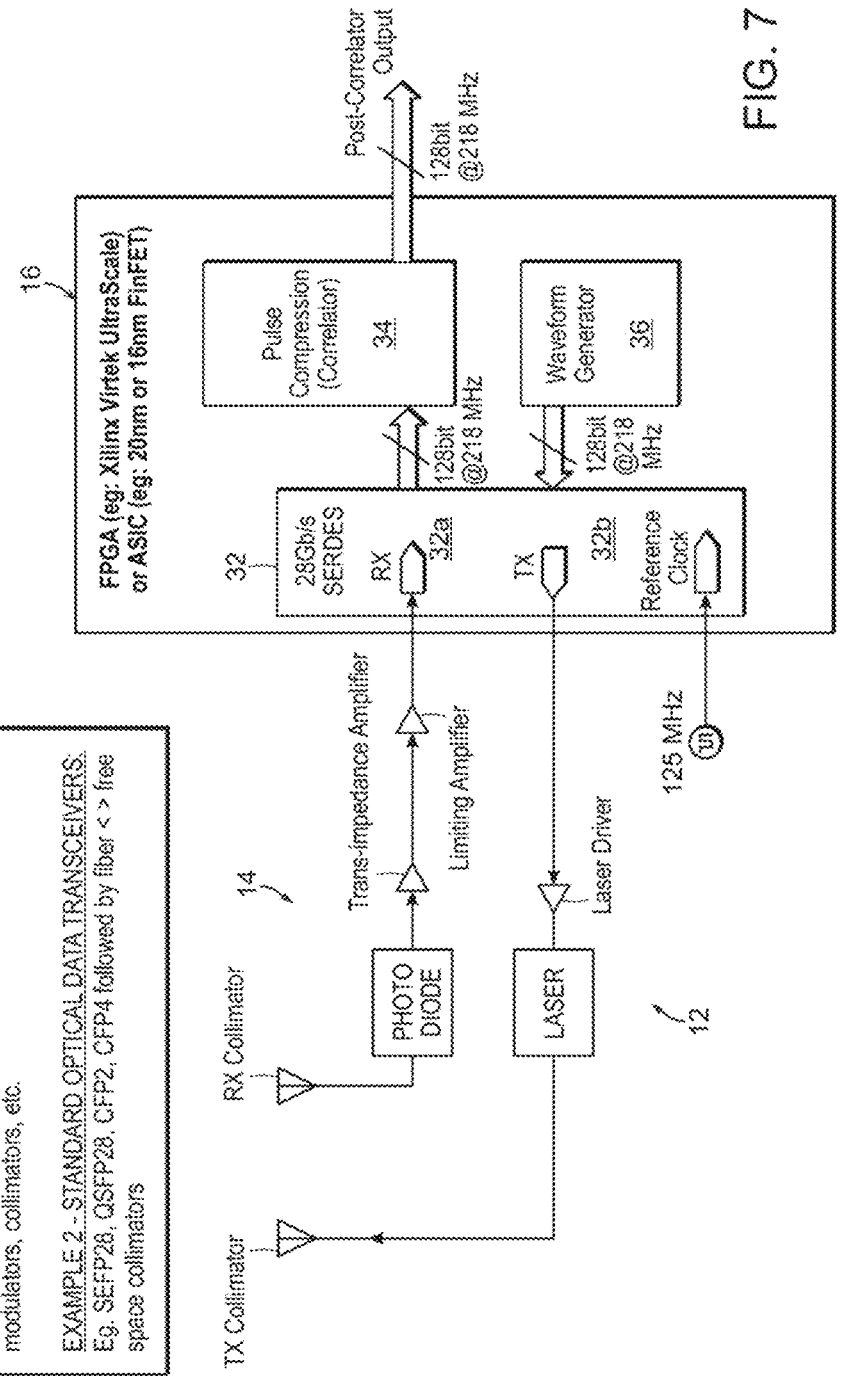
FIG. 7 depicts an embodiment of the invention in a LIDAR application.

FIGS. 5 and 6 depict embodiments of the invention in direct-to-radio frequency (FIG. 5) and heterodyne—BPSK modulation (FIG. 6) RADAR applications. FIG. 7 depicts an embodiment of the invention in a LIDAR application. Similar designations are used in FIGS. 5-7 as in FIG. 1 to designate elements of like function. Construction and operation of those elements will be evident to those of ordinary skill in the art in view of the teachings above and those that follow.

Features of the embodiments of FIGS. 5-7 include:
1. Use of the serializer 32b, i.e., the "Transmit side" of the SERDES 32, as a 1-bit Digital-To-Analog Converter operating at 28 giga samples per second (GSPS) and with a 14 GHz analog bandwidth.
2. Use of the deserializer 32a, i.e., the "Receive side" of the SERDES 32, as a 1-bit Analog-to-Digital Converter operating at 28 giga samples per second (GSPS) and with a 14 GHz analog bandwidth.
3. Use of the high input/output throughput (several terabits/sec) and logic capacity (over 1 M flip flops) of an FPGA or ASIC to implement signal processing that operates at 28 giga-samples per second (GSPS) to effect functions attributed herein to the SERDES, the correlator 34 and the waveform generators 36, among the other elements discussed above.

A. Detailed Operation of the Transmit Side of the SERDES 32

The Transmitter (TX) portion 32b of the SERDES acts as a 1-bit DAC operating at 28 GSPS.

Each generated sample is either a positive or a negative going pulse of amplitude 1.1 Vpp delivered into a 100 ohms differential transmission line forming the transmit section 12. The rise/fall time is ~12 picoseconds (ps) with an RMS time jitter of ~8 ps.

In a RADAR application, the system generates waveforms with desirable autocorrelation properties (minimal autocorrelation amplitude at any lag other than zero). One practical example of such waveforms is a Pseudo Random Noise sequence (PRN). In particular, when multiple RADARs are operating in proximity and with the same carrier frequency (e.g., automotive RADAR), the system assigns each RADAR its own PRN sequence which is orthogonal to all others (Viterbi sequences). The sequence can either be stored in memory or it can be generated 'on the fly' with a Linear Feedback Shift Register (LFSR), e.g., that forms part of the waveform generator 36.

Figure 8:
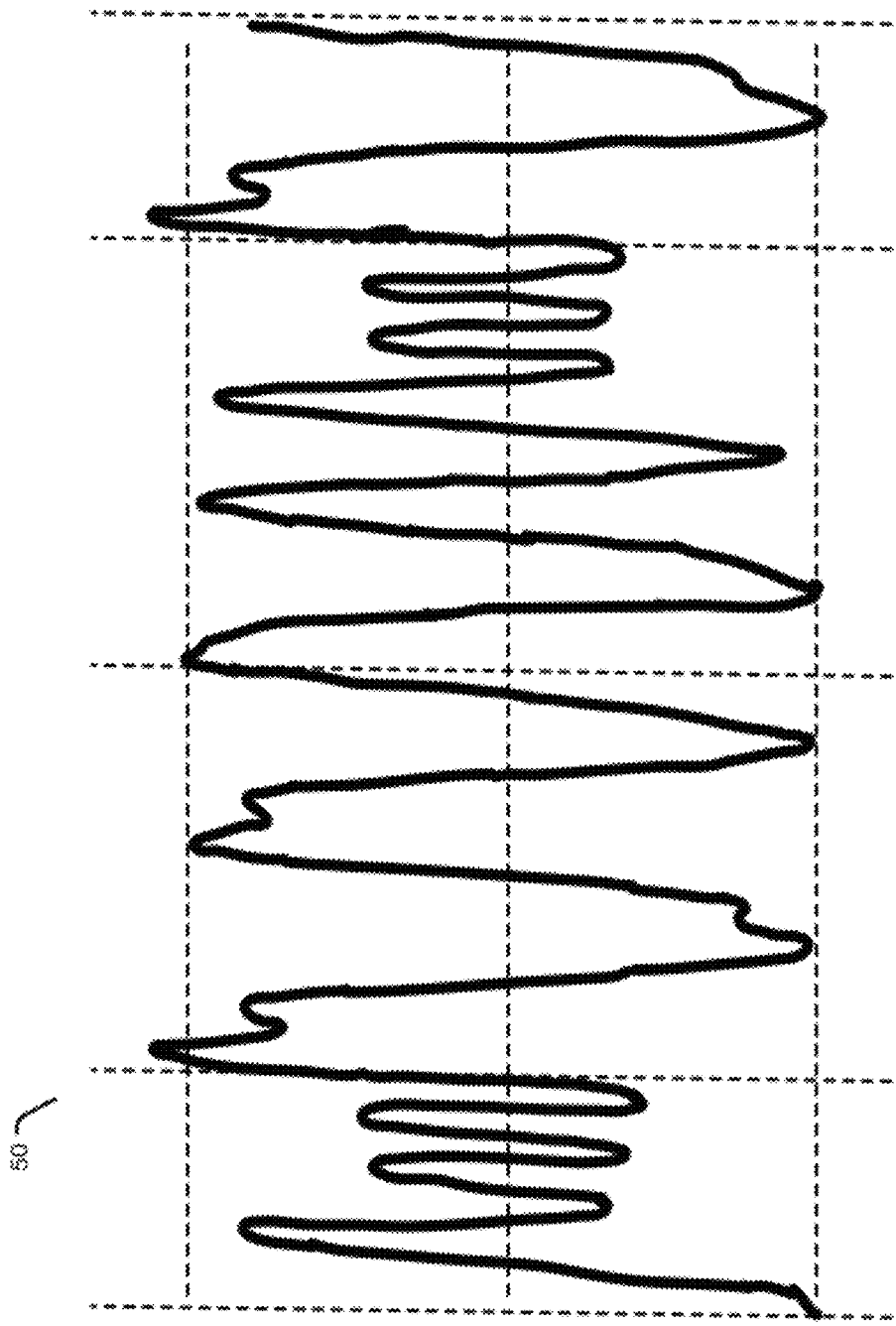
FIG. 8 depicts a waveform resulting from transmission of a digital chirp through transmit circuitry of the type shown in FIGS. 1 and 5.

Another practical waveform example is the digital approximation of a Chirp. See FIG. 8 depicting a waveform 50 resulting from transmission of the digital sequence 1111000011100011100110011010101010 through transmit circuitry of the type shown in FIGS. 1 and 5, by way of example, and discussed above in connection with FIG. 1.

B. Detailed Operation of the Receive Side 32a of the SERDES 32

The Receive side 32a of the transceiver (SERDES 32) acts as a 1-bit ADC (comparator) operating at 28 GSPS, with a rise/fall time of ~12 ps and an RMS time jitter of ~8 ps. The receiver (RX) 32a input may have a 100 Ohm differential input impedance. In one embodiment, in order to guarantee 1×10e-12 Bit-Error-Rate, the differential amplitude of the input signal is at least 250 mV. In an embodiment the driver amplifiers 28, 30 in front of the RX input brings the desired sampled signal up to at least 250 mV.

The SERDES 32a outputs a Parallel data stream 40 of 128 bit width at a rate of 218 MHz.

In order to guarantee a deterministic latency, all the clock tracking and correction capabilities (Clock & Data Recovery (CDR)) of the SERDES have been disabled.

C. Receive Digital Signal Processing by the Correlator 34:

The correlator 34 runs at a rate of 28 GSPS and features true 28 GHz analog analysis bandwidth. For comparison, an MIT Lincoln Labs state-of-art RADAR from 2011 boasted a principal figure-of-merit of a correlator which ran at only 4 GSPS.

The correlator coefficients, which can be stored in an EEPROM or other memory (not shown) that forms part of and/or is coupled to correlator 34, may be reconfigured by way of applied updates. For comparison, a prior-art Surface-Acoustic-Wave correlator, while capable of running at a comparable 28 GHz analog bandwidth, has its coefficients "etched into its geometry."

D. Operation

The SERDES receiver 32a outputs a stream of 128 bit-wide words at a rate of 218 MHz. Each bit corresponds to a single sample. The least significant bit (LSB) is the first and the most significant bit (MSB) is the last sample to have made it into the RX sampler 32a of the SERDES 32. In order to implement a time-domain correlation, the system performs a Multiply-and-Accumulate operation on the incoming RX sequence with a time-reversed version of the transmitted sequence.

E. Real-Time Operation

One hundred twenty eight (128) Multiply-and-Accumulate units 44 are provided in the illustrated embodiments, operating in parallel, each assigned to one of the 128 possible time-shifts. Multiply-and-Accumulate unit 44 operation is implemented in a pipelined manner:

The first pipeline stages execute per-sample multiplication as a bit wise XOR. This is legal because each sample is only 1-bit in amplitude.

The subsequent pipeline stages accumulate (fold) the results of all the individual XORs.

In order to close timing, embodiments implement enough pipeline stages to achieve a 218 MHz throughput.

Resource utilization for an embodiment as described above is as follows:

A 256 sample-wide real-time correlator consumed 8782 Logic Cells in Xilinx UltraScale technology. This corresponds to 0.7% utilization of a Xilinx Virtex UltraScale VU095.

Based on this, an estimate is fitting up to $10^4$-$10^5$ sample-wide real-time correlator in this device.

F. Non-Real-Time Operation:

In order to implement longer correlators 34, embodiments first store the samples into local memory.

For a quadrature phase shift keying (QPSK) full 28 GHz analog bandwidth design, embodiments use a memory bandwidth of at least 7 GB/sec, such as DDR4. A 128 GB DDR4 memory module will be capable of storing 1×10e12 samples for later correlation offline.

Beam Forming

Figure 9:
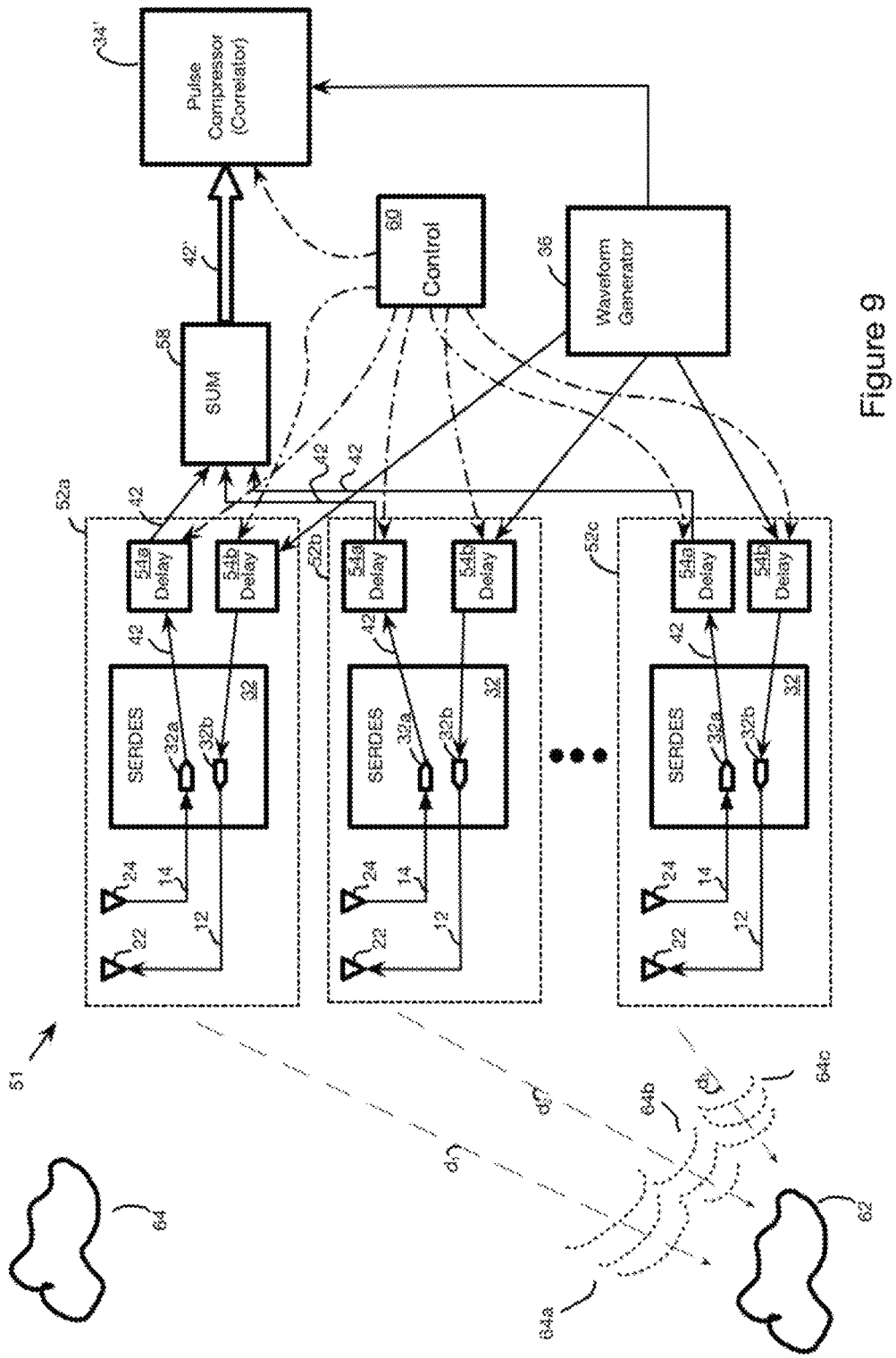
FIGS. 9-10 depicts a range-finding system with beam-forming capacity according to one practice of the invention having parallel transceiver sections and a common correlator.
Figure 10:
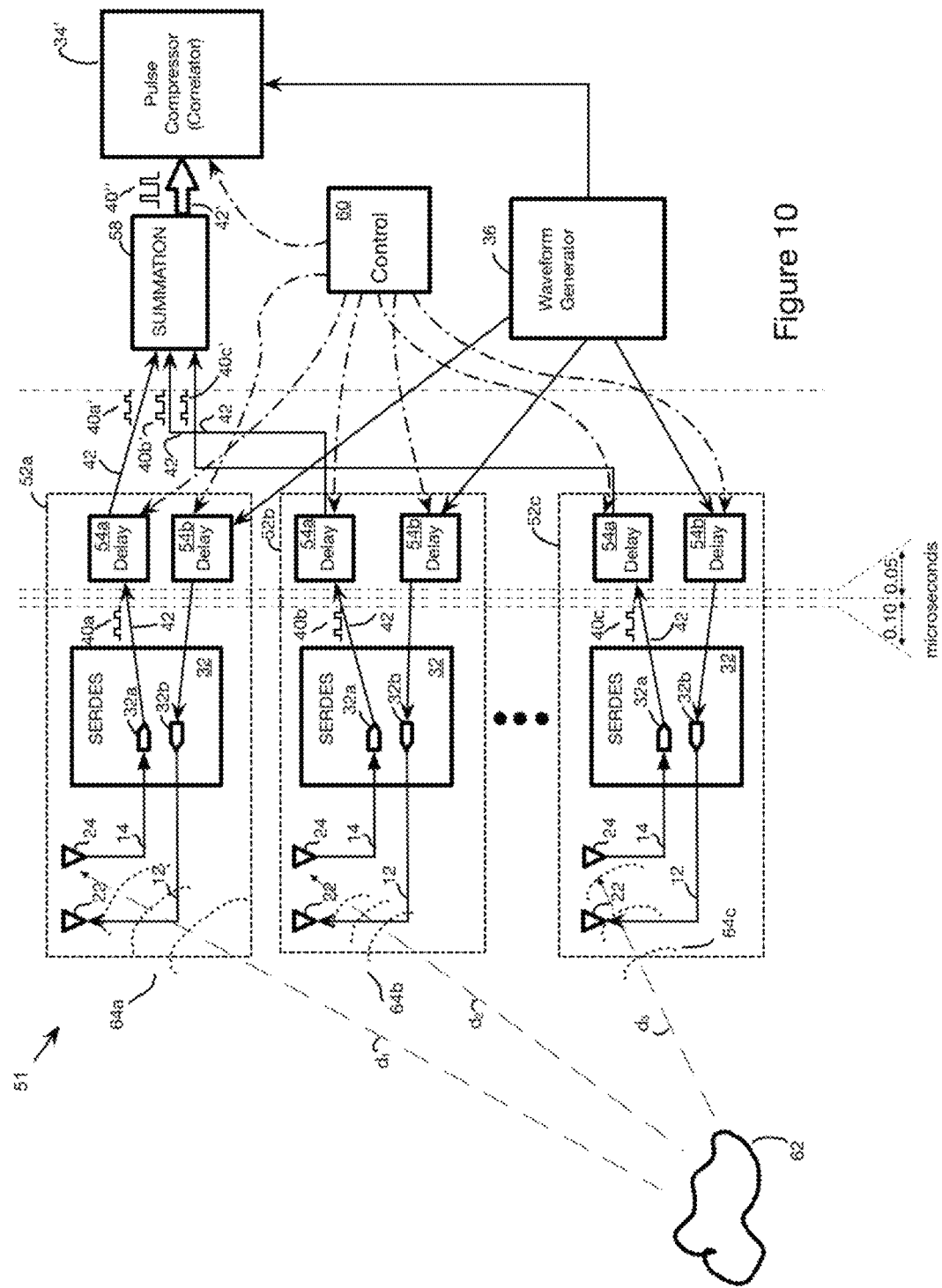
Figure 11:
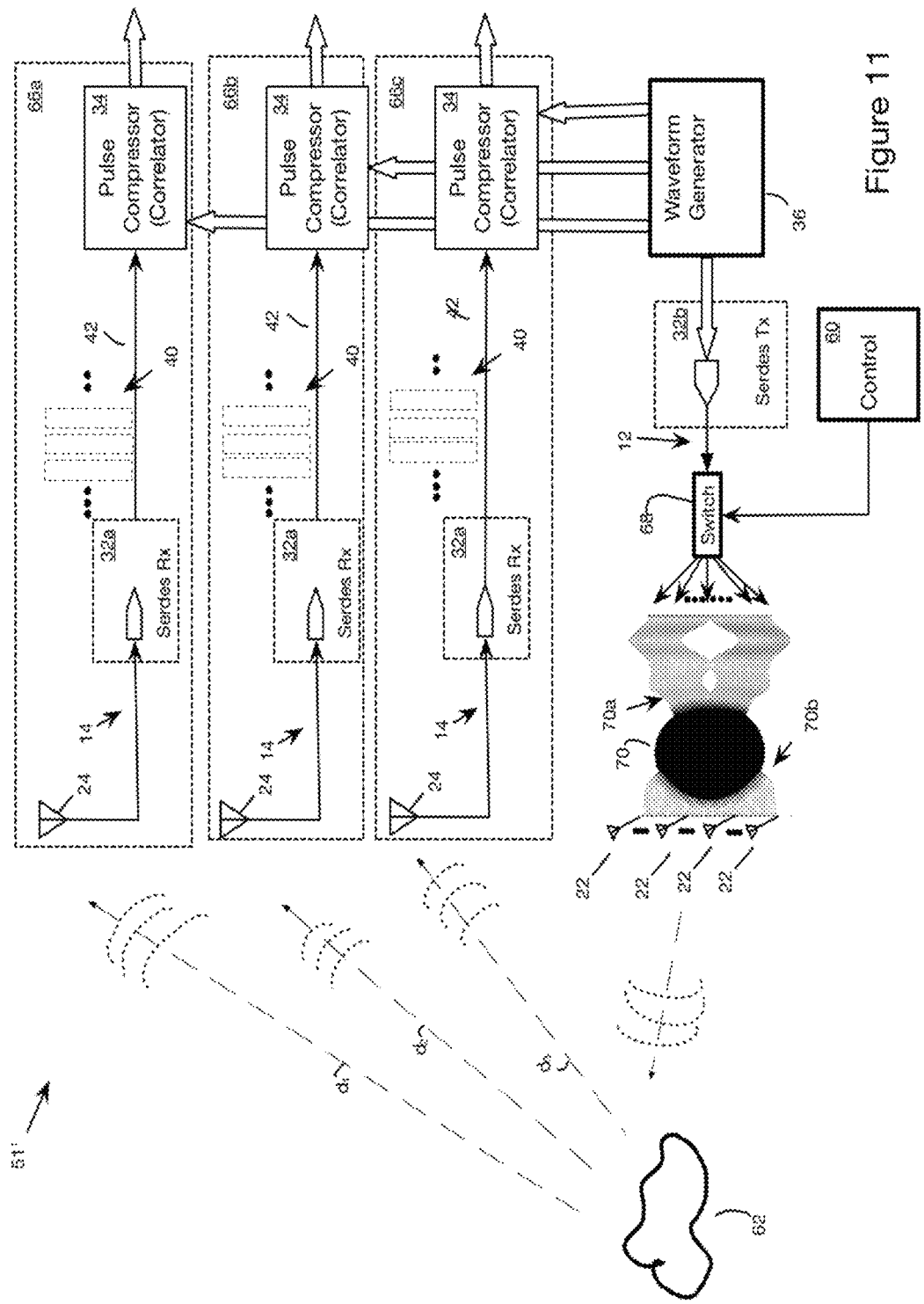
FIG. 11 depict a range-finding system with beam-forming capacity according to one practice of the invention having a bootlace lens and, particularly, a Rotman lens, and parallel receiver sections.

Described below and illustrated in FIGS. 9-11 are range-finding systems that utilize beam forming or beam steering (terms that are used synonymously herein) to determine the bearing, e.g., as well as the presence, distance, velocity, doppler and/or other characteristics, of an object. The systems accomplish this by (i) altering the actual (or effective) directionality of pulses transmitted by the systems into the environment and/or (ii) inferring object bearing from pulses reflected by it and received, e.g., by multiple antennas. As used herein, "bearing" refers to the angle or direction of an object vis-à-vis a range-finding system or, more typically, for example, vis-à-vis a vehicle on which such a system is disposed. FIGS. 9-10 depict such a range-finding system 51 that utilizes parallel transceiver sections and a common correlator. FIG. 11 depict another such system with a Rotman lens and parallel receiver sections. These systems utilize componentry of the types discussed above in connection with FIGS. 1-4 (as indicated by the use of like reference numbers), albeit configured as shown in FIGS. 9-11, and operate similarly thereto, as modified in accord with those drawings and discussed below.

Parallel Transceiver Sections and Common Correlator

Referring to FIGS. 9-10, range-finding system 51 includes parallel transceiver sections 52a, 52b, 52c, three of which are shown in the drawings and discussed below (though, it will be appreciated that other embodiments may utilize a greater or lesser number of such sections). Each section 52a-52c comprises transmit logic 12, including transmit antenna 22, and receive logic 14, including receive antenna 24, as illustrated. Transmit logic 12 of each of the sections 52a-52c comprise componentry (not necessarily shown in FIG. 9) selected, configured and operated as discussed above in connection with FIGS. 1-4, e.g., under the heading "Transmit Logic," for RADAR or other wave-based ranging protocol on which the system 51 is based. Likewise, receive logic 14 of each of sections 52a-52c comprise componentry (again, not necessarily shown in FIG. 9) selected, configured and operated as discussed above in connection with FIGS. 1-4, e.g., under the heading "Receive Logic," for RADAR or other wave-based ranging protocol on which system 51 is based.

Transmit logic 12 and receive logic 14 of each transceiver section, e.g., 52a, utilize a carrier wave and/or other protocol for transmission and reception of pulses that is (i) common to that section, e.g., 52a, yet, (ii) different (at least, discernibly so by the componentry of the respective sections) from that used by the other sections, e.g., 52b, 52c. Thus, by way of simple example, transceiver sections 52a may transmit and receive pulses utilizing a carrier of frequency $F_1$, transceiver section 52b may utilize frequency $F_2$, and transceiver section 52c may utilize frequency $F_3$. Alternatively, by way of further example, the transceiver sections 52a, 52b, 52c can utilize the same frequency, but transmit different coded pulses sequences, $P_1$, $P_2$, and $P_3$, respectively. Accordingly, although the pulses transmitted and received by the transceiver sections 52a-52c may be the same (albeit, encoded in different respective carrier waves), those sections can transmit/receive respective pulses at the same times without substantial cross-talk or other inter-channel interference.

Each transceiver section 52a-52c additionally includes a SERDES 32 that operates in the manner of the SERDES shown in FIGS. 1-4 and described above in connection therewith, e.g., under the heading "Serializer/Deserializer (SERDES)," as adapted in accord with the teachings below. Each SERDES of the system 51 has (i) a deserializer 32a that is coupled to and operates in conjunction with the receiver logic 14 of that respective section in like manner as that of the corresponding elements shown in FIGS. 1-4 and described above in connection therewith, and (ii) a serializer 32b that is coupled to and operates in conjunction with the transmit logic 12 of the respective section 52a-52c, again, in like manner as that of the corresponding elements shown in FIGS. 1-4 and described above in connection therewith. In system 51 of FIGS. 9-10, the input of the serializer 32b of each SERDES 32 is coupled to the waveform generator 36 via time delay logic 54b. Moreover, in system 51, the circuit path that carries longwords (e.g., nibbles) generated at the output of the deserializer 32a of each SERDES 32 includes delay logic 54a and summation logic 58 coupled in series as shown to the correlator 34'.

Delay Logic

Delay logic elements 54a, 54b, which comprise digital delay lines of the type known in the art as adapted in accord with the teachings hereof, are sized to match the width of the circuit paths on which they reside. The elements 54a, 54b may be set dynamically and independently of one another in order to effect different and differing delays (or pauses) in respective streams or signals passing through them. In the illustrated embodiment, control logic 60 is coupled to the elements 54a, 54b to set those delay intervals in accord with the teachings hereof.

Particularly, delay logic 54a of each transceiver section 52a-52c comprises a digital delay line for delaying the respective digital stream 40a-40c of n-bit longwords received from the respective deserializers 32a a designated time interval $\Delta_1$ before passing that stream to summation logic 58. Likewise, delay logic 54b of each transceiver section 52a-52c comprises a digital delay line that delays, by a time interval $\Delta_2$, application to the respective serializer 32b of the multi-bit digital value generated by the waveform generator 36 and that, hence, that delays that respective transceiver section from transmitting into the environment a pulse based on that value by the time interval $\Delta_2$.

The control logic 60, which may comprise a state machine, microprocessor or other logic operating in accord with the teachings hereof, may be coupled to (and, indeed, may form part of) the above-described logic that determines the presence, distance and/or velocity of objects which caused those reflections, i.e., what is hereinafter, referred to as the "range-finding logic."

Steering Transmitted Pulses

The transmit logic 12 of the respective transceiver sections 52a-52c, including their respective serializers 32b and antennas 22 (among their other components), operate in conjunction with the waveform generator 36 in like manner as described above in connection with those same-named elements in the embodiments of FIGS. 1-4. Thus, consistent with the discussion above under the heading "Serializer," the serializer 32b of each section 52a-52c serializes or ungroups a multi-bit value at its input and applies it, e.g., as a stream of individual bits, to the transmit logic 12 of the respective section 52a-52c to be transmitted as a pulse into the environment or otherwise. As above, such a serializer 32b effectively operates as a 1-bit DAC that converts digital signals applied to it into the stream of individual bits that it applies to the transmit logic 12 as if that stream were an analog signal for amplification and broadcast as pulses by the transmit antenna 22.

As noted above, the respective inputs of the serializers 32b of the transceiver sections 52a-52c receive a multi-bit digital value embodying the pattern on which pulses transmitted into the environment are to be based. In the embodiment of FIGS. 9-10, a same such value is applied by the generator 36 to all of the serializers 32b via their respective delay logic elements 54b.

By applying different time delay values $\Delta_2$ to one or more of those elements 54b, the system 51 and, more particularly, for example, the control logic 60, can "aim" the effective direction at which those bit-patterns are transmitted into the environment so that they arrive at more nearly the same time at objects disposed in the range of the system 51 (and, more typically, for example, of a vehicle on which that system is disposed). Moreover, by varying the values of $\Delta_2$ over time, the system 51 and, more particularly, for example, the logic 60, can "steer" the effective direction at which the bit-patterns are transmitted into the environment over a range of angles in the range of and/or on a path of motion of the system 51 (and, more typically, for example, of a vehicle on which that system is disposed).

For example, by setting $\Delta_2$ to 0 microseconds for delay logic element 54b of section 52a, $\Delta_2$ to 0.05 microseconds for element 54b of section 52b, and $\Delta_2$ to 0.10 microseconds for element 54b of section 52c, control logic 60 can insure that pulses transmitted by the respective antennas 22 of those transceiver sections 52a-52c arrive more nearly at the same time at object 62 that is disposed closer to antenna 22 of section 52c, further from the corresponding antenna of section 52b, and further still from that antenna of section 52a, e.g., as depicted in FIG. 9. In instances where the object 62 is moving relative to system 51, this has the advantage of insuring that distance information discernible by the system 51 from reflections of those pulses can be used for more accurate triangulation of the position of object 62.

Moreover, by varying the values of $\Delta_2$ over time—e.g., continuing the above example, by incrementally varying $\Delta_2$ for delay logic element 54b of section 52a from 0 microseconds 0.10 microseconds, $\Delta_2$ for element 54b of section 52c from 0.05 microseconds to 0 microseconds and back up to 0.05 microseconds, and $\Delta_2$ for element 54b of section 52b from 0.10 microseconds to 0 microseconds—the control logic 60 can steer the pulses transmitted by the respective antenna so that they scan in "front" of the array of transmit antennas 22 of system 51 to a location of object 64 (FIG. 9) that is disposed closer to antenna 22 of section 52a, further from the corresponding antenna of section 52b and further still from that antenna of section 52c, as shown in the drawing. Operation of control element 60 to effect setting and varying the values $\Delta_2$ of the delay logic elements 54b—and, therefore, the steering of the transmitted pulses—is within the ken of those skilled in the art in view of the teachings hereof.

Steering Received Pulses

The receive logic 14 of the respective transceiver sections 52a-52c, including their respective deserializers and antennas 24 (among their other components), operate in like manner as described above in connection with those same-named elements in the embodiments of FIGS. 1-4. Thus, referring to FIG. 10, consistent with the discussion above under the heading "Deserializer," the deserializer 32a of each section 52a-52c operates as a 1-bit ADC that, in effect, samples and converts an incoming "analog" signal (received at its input) representing possible reflections of a pulse received from the environment into respective streams of longwords (produced at its output) 40a-40c.

Unlike the embodiments described above in connection with FIGS. 1-4, the respective outputs of the deserializers 32a of the transceiver sections 52a-52c of system 51 are not directly coupled to the correlator 34'. Rather, as shown in FIG. 10, circuit path 42 routes the corresponding longword streams 40a-40c to that correlator via respective delay logic elements 54a and, in turn, the summation element 58.

Together, the elements 54a and 58 are used to time-delay or time-offset the streams 40a-40c relative to one another and to sum samples from those time-delayed streams. (As those skilled in the art will appreciate, delays can be inserted into each stream 40a-40c between or within longwords, e.g., by inserting series of bits that do not correlate highly with the bit pattern from generator 36.) By correlating the summed, time-delayed samples against the pulse bit-pattern (from generator 36) in correlator 34', the system 51 identifies combinations of delays $\Delta_1$ that cause samples of reflections of that bit-pattern received by the sections 52a-52c to best align. To this end, control logic 60 applies different values of $\Delta_1$ to the delay elements 54a and varies those values incrementally or otherwise, thereby, "steering" the system's directional sensitivity to the reflected pulses.

From the values of $\Delta_1$ that make up the aforesaid "best" combinations, the transit times of the reflected pulses is determined and, in turn, distances from the antennas of each section to the object that caused the reflection. Its location is triangulated from those distances. These calculations, implementation of which is within the ken of those skilled in the art, can be effected by the aforesaid range-finding logic.

This can be better understood by way of the example shown in FIG. 10. Shown there are pulses, here, represented by wavefronts 66a, 66b, 66c, reflecting (e.g., at nearly the same time) from object 62 in range of the system 51. Since the object 62 is closer (here, a distance d3) to antenna 24 of transceiver section 52c, its reflected pulses arrive there first, say, for sake of example, at a time $t_1$. The reflected pulses arrive at the antenna 24 of section 52b, which is a bit further away from the object (here, a distance d2) at a slight time-offset later, say, for sake of example, at $t_1$+0.05 microseconds and, still a further offset later, say, at $t_1$+0.10 microseconds, at antenna 24 of section 52a, which is even further away (here, a distance d3).

Since, in the illustrated embodiment, the circuit paths through the sections 52a-52c are substantially identical, the respective deserializers 32a of those sections generate streams 40a-40c with corresponding time offsets of 0, 0.05 and 0.10 microseconds, as shown. Referring to FIG. 10 and continuing with the example above, by varying the respective $\Delta_1$'s of the delay logic elements, however, the pulses can be brought into alignment—in this example, by setting $\Delta_1$ of delay logic element 54a of section 52a to 0.0 microseconds, $\Delta_1$ of delay logic element 54a of section 52b to 0.05 microseconds and $\Delta_1$ of delay logic element 54a of section 52c to 0.1 microseconds. See streams 40a'-40c' in the drawing.

Summation and Correlator Supporting the Steering Received Pulses

Common summation element 58 performs sample-by-sample arithmetic sums on the streams received from delay elements 54a of the transceiver sections 52a-52c. In the embodiment illustrated in FIG. 10, the element 58 accepts as input the streams 40a'-40c' and produces as output the resultant stream 40". In operation, for example, if stream 40a' contains the sample values "1 0 0 1 0 0 1," stream 40b' contains the sample values "1 1 0 0 1 0 0," and stream 40c' contains the sample values "1 0 1 0 0 1 0," the summation element 58 sums the corresponding samples to produce a resultant stream 40" having the values "3 1 1 1 1 1 1". Element 58 may be implemented as a multi-input adder or other digital logic element or circuit suitable for such purpose within the ken of those skilled in the art. The summation element 58 routes the resultant stream 40" to correlator 38 via circuit path 42'.

Where the time delays imposed by elements 54a on the streams 40a-40c are such that their outputs 40a'-40c' are aligned in constructive interference, the summation of those streams by element 58 highlights that fact, as shown in the examples below, where each sample is shown as a single value (0 or 1, in the case of streams 40a'-40c'; and 0-3, in the case of stream 40").

Example 1—Fully Aligned Stream

| Stream 40a': | 1 0 0 1 0 0 1 |
|---|---|
| Stream 40b': | 1 0 0 1 0 0 1 |
| Stream 40c': | 1 0 0 1 0 0 1 |
| Stream 40": | 3 0 0 3 0 0 3 |

Example 2—Partially Aligned Stream

| Stream 40a': | 1 0 0 1 0 0 1 |
|---|---|
| Stream 40b': | 1 0 0 1 0 0 1 |
| Stream 40c': | 0 1 0 0 1 0 0 |
| Stream 40": | 2 1 0 2 1 0 0 |

Example 3—Non-Aligned Streams

| Stream 40a': | 1 0 0 1 0 0 1 |
|---|---|
| Stream 40b': | 0 1 0 0 1 0 0 |
| Stream 40c': | 0 0 1 0 0 1 0 |
| Stream 40": | 1 1 1 1 1 1 1 |

As evident in Example 1, when streams 40a'-40c' are fully aligned, the resultant stream 40" has "peaks" (here, represented by the value '3') and troughs (here, represented by the value '0') emphasizing that alignment. Such a resultant stream 40" will correlate highly with a pulse bit-pattern (from generator 36), for example, of "1 0 0 1 0 0 1". Such is not the case of the partially aligned streams of Example 2 (the resultant stream of which will correlate only moderately with that bit-pattern) and Example 3 (the resultant stream of which will show almost no correlation with that bit-pattern).

Whereas circuit path 42 has a width n (e.g., 4 bits, 128 bits, or so forth) that, typically, matches the size of the longwords generated by the deserializer 32a, circuit path 42' is sized to accommodate a stream of larger, summed sample values in the stream 40"—e.g., a stream of n two-bit values (suitable to accommodate summed values up to three in the example above) for the embodiment shown in FIGS. 9-10, rather than n one-bit values carried by circuit path 42'. Of course, still wider circuit paths 42' may be required for embodiments with additional transceiver sections 52a-52c and/or for embodiments in which each sample generated by the deserializers 32a is itself a multi-bit value, and so forth.

Correlator 34' of FIGS. 9-10 is constructed and operated in like manner as described above in connection with element 34 in the embodiments of FIGS. 1-4, e.g., under the headings "Correlator," "Sample Registers," "Multiply and Accumulate Units," and "Bit Pattern Store." However, the correlator 34' of FIGS. 9-10 correlates the bit-pattern that is embodied in the multi-bit digital value from waveform generator 36 against the resultant stream 40" output by the summation element 58 containing sample-by-sample sums of the time-offset streams provided by delay elements 54a from multiple deserializers 32a—rather than against the digital stream of longwords produced by a single deserializer 32a (as described above in connection with FIGS. 1-4).

Moreover, the sample registers 44 (not shown) of the correlator 34' of FIGS. 9-10 are sized to accommodate the stream of larger, summed sample values in the stream 40" (e.g., a stream of n two-bit values in the example above)—rather than n one-bit values as in the case of the embodiments discussed above in connection with FIGS. 1-4. Furthermore, since the summed sample values embodied in stream 40" are multi-bit values (e.g., two bits in the example discussed above), the MAC units (not shown) of correlator 34' use conventional multiply (and accumulate) operations—rather than Boolean XOR operations as discussed in connection with FIGS. 1-4.

As with the MAC units of correlator 34 of FIGS. 1-4, the MAC units of correlator 34' of FIGS. 9-10 correlate the pulse bit-pattern (from generator 36) against the differentially time-offset, summed sample values in stream 40" as stored in the corresponding registers 44. When a correlation of sufficiently high degree is found, the aforesaid range-finding logic determines the transit times of the reflected pulses generated and received by each transceiver section 52a-52c, e.g., based on stored signal timing information (including the delays $\Delta_2$ with which the pulses were transmitted into environment and the delays $\Delta_1$ with which they resulting pulse reflection samples were aligned) and/or circuit path lengths within the system 51. The range-finding logic, in turn, determines distances from the antennas of each section 52a-52c to the object 62 that caused the reflections. That latter calculation, which is also within the ken of those skilled in the art, can be based on the absolute or relative antenna placements (e.g., on a vehicle on which system 51 is disposed). Using triangulation, the range-finding logic can then determine the object's 62 distance, velocity, bearing, doppler, and/or absolute or relative position for display, collision detection or otherwise, again, as is within the ken of those skilled in the art in view of the teachings hereof.

In alternative embodiments of the invention, steering of received pulses is achieved as described above, yet, by performing correlations before summations. In these embodiments, a correlator is provided in each transceiver section downstream of the deserializers (and upstream of the delay elements) in order to match the digital samples against the patterns on which transmitted pulses are based. Summation elements are coupled to the transceiver sections to sum the corresponding correlator outputs and, thereby, facilitate finding the delays $\Delta_1$ resulting in the largest correlation sum, i.e., when the pulse reflection sample streams are best aligned.

Parallel Receiver Sections and a Rotman Lens

FIG. 11 depicts a range-finding system 51' that includes a Rotman lens to steer transmitted pulses and that includes parallel receiver sections, each with its own correlator, to facilitate determining object bearing from reflections of those pulses. Three receiver sections 66a-66c are shown in the drawing and discussed below; however, it will be appreciated that other embodiments may utilize a greater or lesser number of such sections.

Steering Transmitted Pulses Using the Rotman Lens

The system 51' includes pulse-generating circuitry—here, comprising a SERDES-based serializer 32b, waveform generator 36, transmit logic 12, switch 68, Rotman lens 70 and transmit antennas 22—that transmits pulses into the environment. The serializer 32b, waveform generator 36, transmit logic 12 and transmit antennas 22 are selected, configured and operated in the same manner as like-named elements shown in FIGS. 1-4 and discussed above, e.g., under the headings "Transmit Logic," "Waveform Generator," "Serializer/Deserializer (SERDES)," and "Serializer," as adapted in accord with the discuss below for beamforming.

In system 51' of FIG. 11, switch 68 and Rotman lens 70 are interposed between the transmit logic and the array of multiple transmit antennas 22. The lens 70, which, as will be appreciated by those skilled in the art, is a type of bootlace lens known in the art suitable for use in steering applied radio frequency signals (see, for example, Rudge, *The Handbook of Antenna Design—Volume* 1 (1982), e.g., at p. 310, et. seq.), is sized and otherwise adapted for use RADAR or other wave-based ranging protocol on which system 51' is based. As per convention, the lens 70 includes a plurality of beam ports 70a coupled to a main body across from a plurality of element ports 70b. The antennas 22 are coupled on a one-to-one basis to the element ports 70b and disposed relative to one another in a pattern matching the disposition of those ports 70b to one another. Although a Rotman lens is utilized in the illustrated embodiment, other embodiments may utilize other types of bootlace lenses instead of the illustrated Rotman lens.

Switch 68, which may be of the type known in the art for selectably routing RF signals in RADAR or other wave-based ranging protocol on which system 51' is based, has (i) an input that is coupled to the transmit logic 12 as illustrated (i.e., upstream of the antennas 22) for receiving the RF signal generated by it following amplification (and, more generally, conditioning) of the serialization stream output by the serializer 32b and (ii) multiple selectable outputs, each coupled to a corresponding one of the beam ports 70a. Output selection is provided by control logic 60', which is coupled to switch 68, as shown.

The switch 68 is used, under control of logic 60', to route and apply an RF signal generated by the transmit logic 12 from the stream output by the serializer 32a to a single one of the beam ports 70a. The Rotman lens, correspondingly, causes that RF signal to be radiated from the antenna array in a direction determined by the ports 70b to which the antennas are coupled. By varying the switch output selection, the logic 60' can steer the pulses transmitted by array of antennas so that they scan in "front" of the array, e.g., in a manner analogous to that discussed above under the heading "Steering Transmitted Pulses."

In some embodiments of system 51', finer steering of the pulse beam output by the antenna array is attained by use of the switch 68, under control of logic 60, to concurrently apply to RF signal generated by the transmit logic 12 to two beam ports 70a. This effects radiation of the RF signal from the antenna array in a direction intermediate to that associated with each of the individual beam ports to which the RF signal is applied. Still finer granularity is attained in other embodiments by varying the "phase" of the RF signal applied on either of those beam ports, e.g., to shift by partial clock cycles the bits represented in that RF signal. Such phase variation can be implemented using a transmit clock phase interpolator of the type commercially available from Xilinx, or like circuitry, under control of logic 60'. Such circuitry (not shown) can be placed in series connection between each output of the switch 68 and each corresponding beam port 70a of the lens 70.

The control logic 60', which may comprise a state machine, microprocessor or other logic operating in accord with the teachings hereof, may be coupled to (and, indeed, may form part of) the aforementioned range-finding logic. Programming or other configuration of the control logic 60 to effect control of the switch 68 is within the ken of those skilled in the art in view of the teachings hereof.

Steering Received Pulses Using the Parallel Receiver Sections

Each receiver section 66a-66c comprises receive logic 14, including receive antenna 24, SERDES-based deserializers 32a and a correlator 34, as illustrated, that receive and process pulse reflections. Receive logic 14 of each of sections 66a-66c comprises componentry (not necessarily shown in FIG. 11) selected, configured and operated as discussed above in connection with FIGS. 1-4, e.g., under the heading "Receive Logic," for RADAR or other wave-based ranging protocol on which system 51' is based.

The deserializer 32a of each section 66a is implemented in a SERDES and is coupled to and operates in conjunction with the receive logic 14 of that respective section in like manner as that of the corresponding elements shown in FIGS. 1-4 and described above in connection therewith. Each section 66a-66c additionally includes correlator 34 that is constructed and operated in like manner as described above in connection with element 34 in the embodiments of FIGS. 1-4, e.g., under the headings "Correlator," "Sample Registers," "Multiply and Accumulate Units," and "Bit Pattern Store."

Together with waveform generator 36, receive logic 14, deserializer 32a and correlators 34 of each receiver sections 66a-66b operate in the manner of the like-named elements shown in FIGS. 1-4 and discussed above, e.g., under the heading "Operation." Like the embodiments discussed there, the deserializer 32a of each receiver section 66a-66c generates a respective digital stream 40 comprising longwords containing 1's and 0's representing the amplitudes of respective samples of an input signal received by logic 14 containing possible pulse reflections.

With each clock or other processing cycle, a longword of each respective digital stream 40 is loaded into the shift registers of the respective correlator. The respective MAC units of those correlators multiply, on a bit-by-bit basis, the values of a respective portion of the respective digital stream buffered in the registers to which that MAC unit is coupled with the bit-pattern that is embodied in the multi-bit digital value from waveform generator 36, and sums the results of those multiplications, e.g., as described above under the heading "Multiply and Accumulate Units."

As further described under that same heading, above, and equally applicable to the system 51' of FIG. 11, an output generated by each MAC of the respective correlators 34 of sections 66a-66c based on the accumulated sum indicates the degree of correlation between the respective portion of the respective digital stream—and, thereby, a respective sampling of possible reflections of pulses received by respective receive logic 14—with the bit-pattern on which the pulses transmitted by logic 12 were based. Those outputs are routed to the aforementioned range-finding logic, which determines the time of receipt of the respective portion of the input signal received by the respective logic 14, once a correlation of sufficiently high degree is found.

The range-finding logic uses times of receipt determined for each section 66a-66c to determine distances from the antennas of each section 66a-66c to the object 62 that caused the reflections. That latter calculation, which is also within the ken of those skilled in the art, can be based on the absolute or relative antenna placements (e.g., on a vehicle on which system 51 is disposed). Using triangulation, the range-finding logic can then determine the object's 62 distance, velocity, bearing, doppler, and/or absolute or relative position of the object 62 for display, collision detection, or otherwise. This, too, is within the ken of those skilled in the art In view of the teachings hereof.

Although illustrated together in the drawing, it will be appreciated that the Rotman lens-based transmit side of system 51' need not be used with the parallel receiver sections 66a-66c and can be used instead with pulse-reflection processing logic of the sort provided in connection with the embodiments of FIGS. 1-4 or FIGS. 9-10 or otherwise. Likewise, the receiver sections of system 51' can be used instead with pulse-transmitting logic of the sort provided in those same embodiments or otherwise.

Described above are systems and methods achieving the objects set forth previously, It will be appreciated that the embodiments described herein are merely examples of the invention and that other embodiments, modifying that which is shown and described here, fall within the scope of the invention.

We claim:

1. In an electromagnetic ranging system of the type that transmits pulses into an environment, the improvement comprising
   A. a serializer/deserializer ("SERDES") having a serializer with (i) an input to which a pattern is applied and (ii) an output on which pulses representing a serialization of the pattern are generated,
   B. transmit logic that is coupled to the output of the serializer of the SERDES and that transmits the pulses into the environment,
   C. the transmit logic including a bootlace lens that directionally steers the pulses transmitted into the environment.

2. In the system of claim 1, the further improvement wherein the bootlace lens is a Rotman lens.

3. In the system of claim 2, the further improvement wherein the Rotman lens has an input that is coupled to receive by way of a switch the pulses generated by the serializer.

4. In the system of claim 3, the further improvement wherein an input of the switch receives the pulses generated by serializer, following any of amplification and conditioning.

5. In the system of claim 3, the further improvement wherein the switch has multiple selectable outputs, each coupled to a corresponding beam port of the Rotman lens.

6. In the system of claim 3, the further improvement wherein the Rotman lens has a plurality of element ports, each of which is coupled to a transmit antenna.

7. In the system of claim 6, the further improvement wherein the switch selectively routes a radio frequency (RF) signal generated from pulses generated by serializer, following any of amplification and conditioning, for application to one or more of the beam ports of the Rotman lens.

8. In the system of claim 7, the further improvement wherein an array comprising plural ones of the transmit antennas radiates the RF signal in a direction determined by the one or more ports of Rotman lens to which the RF signal is applied.

9. In the system of claim 6, the further improvement wherein the switch selectively routes radio frequency (RF) signal generated from the pulses generated by serializer, following any of amplification and conditioning, for application to two beam ports of the Rotman lens.

10. In the system of claim 9, the further improvement comprising circuitry interposed between each output of the switch and each corresponding beam port of the Rotman lens, where that circuitry varies a phase of the signals transferred therebetween.

11. In a ranging system of the type that transmits a pulse into the environment, the improvement comprising
   A. transmit logic that transmits a plurality of pulses into the environment based on an applied signal, the applied signal comprising a signal that is applied to the transmit logic,
   B. a plurality of receiver sections, each that has receive logic that receives from the environment an analog signal that is a possible reflection of the plurality of pulses, each receiver section further comprising
      (i) a serializer/deserializer ("SERDES") having a deserializer that is coupled to the receive logic of that section and that generates a stream of digital samples of the analog signal received by that receive logic,
      (ii) a correlator that correlates that stream against a pattern on which the transmitted plurality of pulses is based.

12. In the ranging system of claim 11, the further improvement comprising range-finding logic that is coupled to the correlators of the plurality of receiver sections.

13. In the ranging system of claim 12, the further improvement wherein the range-finding logic determines any of a distance, velocity, bearing, doppler, and/or absolute or relative position of an object from which a said plurality of pulses transmitted by the transmit logic and received by the receiver sections is reflected.

14. In the ranging system of claim 11, the further improvement in which each deserializer samples the applied analog signal at a rate of at least 3 gigasamples per second (GSPS).

15. In the ranging system of claim 11, the further improvement in which each deserializer samples the applied analog signal at a rate of at least 28 gigasamples per second (GSPS).

16. In the ranging system of claim 11, the further improvement in which the SERDES is implemented in any of a ASIC and an FPGA.

17. In the ranging system of claim 11, the further improvement
   wherein each correlator comprises a plurality of multiply-and-accumulate (MAC) units, each coupled to receive a respective portion of the digital stream from the deserializer of the respective receiver section,
   where each portion of the digital stream comprises a plurality of successive or substantially successive samples of the analog signal received by that receiver section, and
   where each portion of the digital stream includes at least one sample not in the other portions.

18. In the ranging system of claim 17, the further improvement wherein where each MAC (i) multiplies its respective portion with of the digital stream, on a bit-by-bit basis, with the signal pattern and (ii) sums results of those multiplications over a plurality of bits that make up that respective portion.

19. In the ranging system of claim 11, the further improvement wherein the transmit logic comprises
   A. a SERDES having a serializer with (i) an input to which a pattern is applied and (ii) an output that is coupled to the transmit logic and on which a serialization of the pattern is generated as the applied signal, and
   B. a bootlace lens.

20. A ranging system comprising
   A. one or more serializer/deserializer's ("SERDES's"), each having a serializer with (i) an input to which a pattern is applied and (ii) an output on which pulses representing a serialization of the pattern are generated,
   B. a plurality of transmit antennas that together transmit said pulses into the environment,
   C. transmit logic that is coupled between the one or more SERDES's and the plurality of transmit antennas to directionally steer the pulses transmitted by those transmit antennas into the environment.

* * * * *